United States Patent
Colombo

(10) Patent No.: US 10,845,999 B2
(45) Date of Patent: Nov. 24, 2020

(54) PROCESSING SYSTEM, RELATED INTEGRATED CIRCUIT, DEVICE AND METHOD

(71) Applicant: STMicroelectronics Application GMBH, Aschheim-Dornach (DE)

(72) Inventor: Roberto Colombo, Munich (DE)

(73) Assignee: STMICROELECTRONICS APPLICATION GMBH, Aschheim-Dornach (DE)

( * ) Notice: Subject to any disclaimer, the term of this patent is extended or adjusted under 35 U.S.C. 154(b) by 0 days.

(21) Appl. No.: 16/249,524

(22) Filed: Jan. 16, 2019

(65) Prior Publication Data

US 2019/0227747 A1 Jul. 25, 2019

(30) Foreign Application Priority Data

Jan. 22, 2018 (IT) .................... 102018000001633

(51) Int. Cl.
*G06F 3/06* (2006.01)
*G06F 9/445* (2018.01)
*G06F 9/4401* (2018.01)

(52) U.S. Cl.
CPC .......... *G06F 3/0623* (2013.01); *G06F 3/0604* (2013.01); *G06F 3/0658* (2013.01); *G06F 3/0679* (2013.01); *G06F 9/4411* (2013.01); *G06F 9/44505* (2013.01)

(58) Field of Classification Search
CPC .. G06F 15/7867; G06F 3/0605; G06F 3/0632; G06F 12/00; G06F 13/364; G06F 3/0659; G06F 9/4411; G06F 9/44505; G06F 3/0679; G06F 3/0604
See application file for complete search history.

(56) References Cited

U.S. PATENT DOCUMENTS

| | | | |
|---|---|---|---|
| 5,781,793 | A | 7/1998 | Larvoire et al. |
| 7,225,373 | B1 | 5/2007 | Edwards et al. |
| 2006/0224851 | A1* | 10/2006 | Tamura ................. G06F 3/0605 711/170 |
| 2009/0063865 | A1 | 3/2009 | Berenbaum et al. |
| 2013/0185482 | A1 | 7/2013 | Kim et al. |
| 2015/0331043 | A1 | 11/2015 | Sastry et al. |
| 2015/0370580 | A1 | 12/2015 | Litovtchenko |

* cited by examiner

*Primary Examiner* — Reginald G Bragdon
*Assistant Examiner* — Thanh D Vo
(74) *Attorney, Agent, or Firm* — Slater Matsil, LLP

(57) ABSTRACT

A hardware configuration circuit configured to sequentially read data packets and transmit the data to a configuration data client. The configuration data client configured to receive a first and a second set of configuration data addressed to a respective address. The client is configured to store the first set of configuration data in a register and verify whether further configuration data may be written to the respective register as a function of a type identification signal. In response, the configuration data client is configured to overwrite the first set of configuration data by storing the second set of configuration data in the respective register or maintain the first set of configuration data by inhibiting storage of the second set of configuration data received in the respective register. The configuration corresponding to verifying whether further configuration data may be written to the register.

24 Claims, 12 Drawing Sheets

PROCESSING SYSTEM, RELATED INTEGRATED CIRCUIT, DEVICE AND METHOD

CROSS-REFERENCE TO RELATED APPLICATIONS

This application claims priority to Italian Patent Application No. 102018000001633, filed on Jan. 22, 2018, which application is hereby incorporated herein by reference.

TECHNICAL FIELD

Embodiments of the present disclosure relate to processing systems, such as micro-controllers, having associated a memory in which configuration data are stored.

BACKGROUND

FIG. 1 shows a typical electronic system, such as the electronic system of a vehicle, comprising a plurality of processing systems 10, such as embedded systems or integrated circuits, e.g., a FPGA (Field Programmable Gate Array), DSP (Digital Signal Processor) or a micro-controller (e.g., dedicated to the automotive market).

For example, in FIG. 1 are shown three processing systems $10_1$, $10_2$ and $10_3$ connected through a suitable communication system 20. For example, the communication system may include a vehicle control bus, such as a CAN (Controller Area Network) bus, and possibly a multimedia bus, such as a MOST (Media Oriented Systems Transport) bus, connected to vehicle control bus via a gateway. Typically, the processing systems 10 are located at different positions of the vehicle and may include, e.g., an Engine Control Unit (ECU), a Transmission Control Unit (TCU), an Anti-lock Braking System (ABS), a body control modules (BCM), and/or a navigation and/or multimedia audio system.

Future generations of processing systems, in particular micro-controllers dedicated to automotive applications, will exhibit a significant increase in complexity, mainly due to the increasing number of functionalities (such as new protocols, new features, etc.) and to the tight constraints concerning the operation conditions of the system (such as lower power consumption, increased calculation power and speed, etc.).

The validation of the various functionalities of each processing system 10 may involve thus a significant portion of the overall development costs: this applies both at the company producing the processing system 10 and the customer side, where the application is developed. For this reason, also the hardware modules within the processing systems 10 implementing security functions are getting more and more important. For example, various processing systems 10 provide the possibility to configure whether the access to the internal resource of the processing system 10 by using an external tool, e.g., a debug interface, is blocked or permitted (possibly specifying whether data may only be read or also written). For example, usually during the development stage it should be possible to control the resources of the processing system 10 with a given degree of freedom, while the processing system 10 should be configured to activate certain security functions (which may not be altered) when the processing system 10 is "in field" (i.e., running in the final application).

For example, most modern micro-controllers use solutions where the enabling of a security feature is done by programming the on/off status in a non-volatile memory. These configuration data are then read during the reset phase in order to enable or disable the related protections, e.g. in order to disable the debug interface of the micro-controller. Thus, a relevant portion of the security configuration is not alterable anymore after the respective configuration information have been programmed into the non-volatile memory, e.g., because, once the debug interface has been deactivated, it is also impossible to overwrite the configuration data. Accordingly, most of the security configuration, once enforced, are not alterable and the protection is always active. Unfortunately, in this way it is also difficult to analyses possible malfunctions of the processing system 10 occurring only in field.

SUMMARY

In view of the above, various embodiments of the present disclosure disclose a dynamic configurability of the security configurations of a processing system.

As mentioned before, various embodiments of the present disclosure relate to a processing system.

In various embodiments, the processing system comprises a plurality of configuration data clients, wherein each configuration data client comprises a register. With each configuration data client is associated a respective address, and each configuration data client is configured to receive configuration data addressed to the respective address and store the configuration data received in the register.

In various embodiments, the processing system comprises also at least one hardware block configured to change operation as a function of the configuration data stored in the registers of the plurality of configuration data clients and a non-volatile memory configured to store the configuration data for the plurality of configuration data clients. Specifically, in various embodiments, the configuration data are stored in the form of data packets comprising an attribute field identifying the address of one of the plurality of configuration data clients and the respective configuration data. Accordingly, a hardware configuration circuit may sequentially read the data packets from the non-volatile memory and transmit the respective configuration data read from the non-volatile memory to the respective configuration data client.

Specifically, in various embodiments, at least one of the configuration data clients is configured to receive a first set of configuration data addressed to the respective address and store the first set of configuration data received in the respective register. Moreover, the configuration data client may receive a second set of configuration data addressed to the respective address. In response to the second set of configuration data, the configuration data client verifies whether further configuration data may be written to the respective register as a function of at least one type identification signal. Accordingly, in case the verification indicates that further configuration data may be written to the respective register, the configuration data client may store the second set of configuration data received in the respective register, thereby overwriting the first set of configuration data. Conversely, in case the verification indicates that further configuration data may not be written to the respective register, the configuration data client inhibits storage of the second set of configuration data received in the respective register, thereby maintaining the first set of configuration data.

For example, in various embodiments, at least one of the identification signals is determined as a function of the configuration data stored in the non-volatile memory.

In various embodiments, the at least one identification signal may comprise a type identification signal signaling whether further configuration data may be written to the respective register. For example, this type identification signal may be provided by a first type identification unit taking into account a default type identification signal signaling whether further configuration data may be written by default to the respective register and optionally one or more bits of the configuration data stored in the register of the configuration data client. For example, the one or more bits may signal whether the default type identification signal should be overwritten, thereby signaling that further configuration data may not be written to the respective register.

In various embodiments, the at least one identification signal may comprise a second type identification signal signaling whether the first type identification signal is overwritten, thereby signaling that further configuration data may be written to the respective register. For example, this second type identification signal may be provided by a second type identification unit taking into account life-cycle data stored in a one-time programmable memory of the processing system, and/or a signal indicating whether a keyword included in the configuration data corresponds to a fixed reference keyword.

In various embodiments, the at least one identification signal may comprise a third type identification signal signaling whether further configuration data may not be written to the respective register. For example, the third type identification signal may be provided by a third type identification unit taking into account life-cycle data stored in a one-time programmable memory of the processing system, and one or more bits of the configuration data stored in the register of the configuration data client. Specifically, the one or more bits may signal one or more life-cycle stages in which further configuration data may not be written to the respective register.

BRIEF DESCRIPTION OF THE DRAWINGS

Embodiments of the present disclosure will now be described with reference to the annexed drawings, which are provided purely by way of non-limiting example and in which.

DETAILED DESCRIPTION OF ILLUSTRATIVE EMBODIMENTS

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

Figure 1:
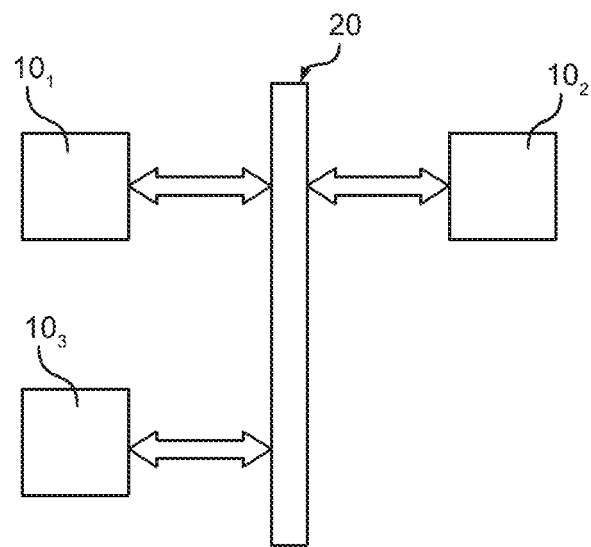
FIG. 1 shows a typical electronic system.

In the following FIGS. 2 to 16 parts, elements or components which have already been described with reference to FIG. 1 are denoted by the same references previously used in such Figure; the description of such previously described elements will not be repeated in the following in order not to overburden the present detailed description.

Figure 2:
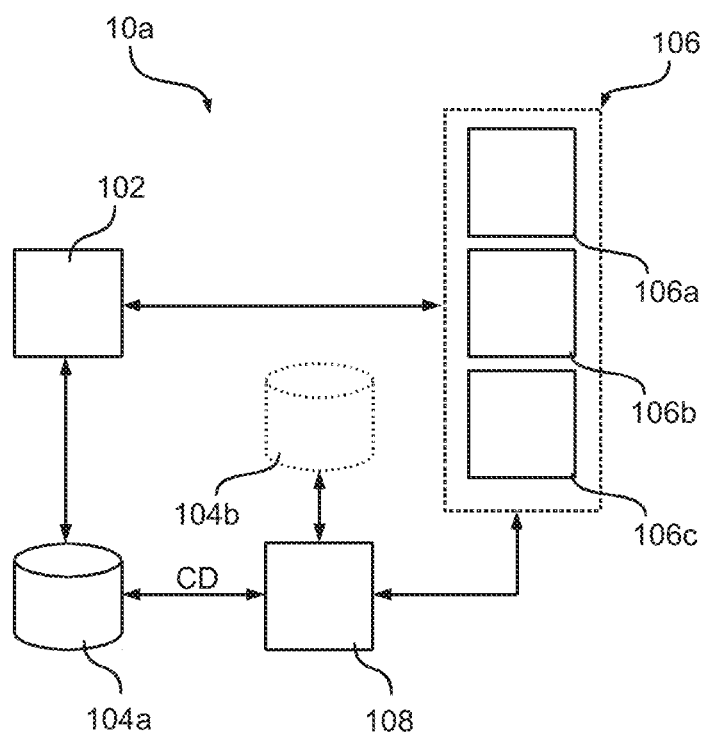
FIG. 2 shows an embodiment of a processing systems comprising a configuration circuit in accordance with the present disclosure.

FIG. 2 shows a block diagram of an embodiment of a digital processing system 10a, such as a micro-controller.

In the embodiment considered, the processing system 10a comprises at least one processing unit 102, such as a microprocessor, usually the Central Processing Unit (CPU), programmed via software instructions. Usually, the software executed by the processing unit 102 is stored in a program memory 104a, such as a non-volatile memory, such as a Flash memory or EEPROM. Generally, the memory 104a may be integrated with the processing unit 102 in a single integrated circuit, or the memory 104a may be in the form of a separate integrated circuit and connected to the processing unit 102, e.g. via the traces of a printed circuit board. Thus, in general the memory 104a contains the firmware for the processing unit 102, wherein the term firmware includes both the software of a micro-processor and the programming data of a programmable logic circuit, such as a FPGA.

In the embodiment considered, the processing unit 102 may have associated one or more resources 106, such as: one or more communication interfaces, such as UART (Universal asynchronous receiver/transmitter), SPI (Serial Peripheral Interface Bus), I2C (Inter-Integrated Circuit), CAN bus (Controller Area Network), Ethernet, and/or debug interface; and/or one or more analog-to-digital and/or digital-toanalog converters; and/or one or more dedicated digital components, such as hardware timers and/or counters, or a cryptographic co-processor; and/or one or more analog components, such as comparators, sensors, such as a temperature sensor, etc.; and/or one or more mixed signal components, such as a PWM (Pulse-Width Modulation) driver.

Accordingly, the digital processing system 10a may support different functionalities. For example, the processing systems may have different hardware architectures. For example, the processing units 102 may have different architectures and processing speeds, and/or the number and type of the hardware resources 106 may vary. Moreover, the behavior of the processing unit 102 is determined by the firmware stored in the memory 104a, e.g., the software instructions to be executed by a processing unit 102 of a micro-controller. Thus, by installing a different firmware, the same hardware (micro-controller) can be used for different applications.

As mentioned before, the behavior of the processing system 10a may also be varied based on configuration data CD. For example, these configuration data CD may be written into specific areas of the non-volatile program memory 104a and retrieved when the processing system 10a is powered on. Alternatively or in addition, the configuration data CD may be stored in an additional non-volatile memory 104b, such as a one-time programmable (OTP) memory, e.g. implemented with fuses. For example, the program memory 104a may be used, in case the blocks shown in FIG. 2 are integrated in a common integrated circuit. Conversely, an additional non-volatile memory 104b may be used, in case the program memory 104a is an external memory, and only the other blocks are integrated in a common integrated circuit. Accordingly, in various embodiments, the configuration data CD are stored in a non-volatile memory (104a and/or 104b) of the integrated circuit comprising the blocks requiring configuration data, such as the processing unit 102 and/or one or more of the hardware resources 106.

For example, such configuration data CD are often calibration data used to guarantee that the hardware behavior is uniform, thereby compensating possible production process tolerances. For example, this applies often to the calibration of analog components of the processing system, such as a temperature sensor, analog-to-digital converter, voltage reference, etc. For example, a voltage monitor threshold level of an analog comparator could be "trimmed" to the exact intended value by adjusting some levels with configuration/calibration data, which are written by the producer of the hardware of the processing systems, e.g. the micro-controller producer.

Moreover, the configuration data CD may also be used to customize the behavior of the hardware, e.g., the hardware resources 106, according to different application needs. For example, once the firmware of the processing system has been stored in the processing system 10a, some configuration data may be written in order to deactivate the debug interface, which e.g. could be used to download the firmware of the processing system 10a. Thus, generally a first part of the configuration data CD may be written by the producer of the hardware of the processing system (e.g., the producer of an integrated circuit), and/or a second part of the configuration data CD may be written by the developer of the firmware of the processing system 10a.

As mentioned before, the programmed configuration data CD may be read during a reset phase, which usually starts as soon as the processing system 10a is powered on.

Specifically, as shown in FIG. 2, the processing system 10a may comprise for this purpose a configuration circuit 108 configured to read the configuration data CD from the non-volatile memory 104a and/or 104b, and distribute these configuration data CD within the processing system 10a.

Figure 3:
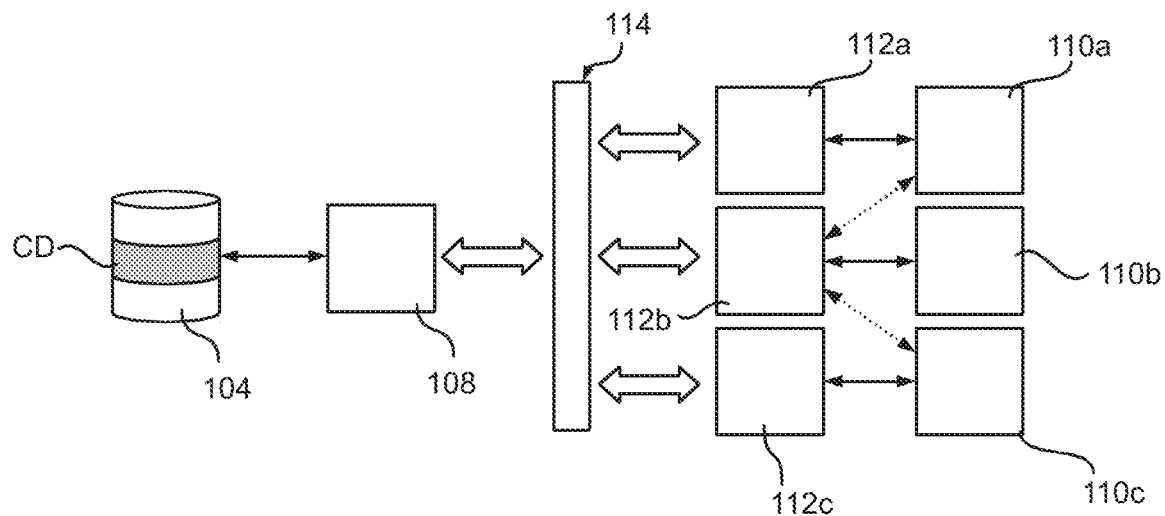
FIG. 3 shows the general architecture of an embodiment of a processing system comprising a configuration circuit and configuration data clients in accordance with the present disclosure.

For example, FIG. 3 shows a possible embodiment for distributing the configuration data CD in the processing system 10a of FIG. 2.

In the embodiment considered, one or more configuration data CD are stored in one or more non-volatile memories 104 (i.e., memories 104a and/or 104b). In various embodiments, these configuration data CD are stored in reserved memory areas, e.g. in the form of a plurality of consecutive memory locations.

Accordingly, in the embodiment considered, the configuration circuit 108 accesses the reserved memory areas containing the configuration data CD, reads the configuration data CD and transmits the configuration data CD to a respective block 110 within the processing system 10a. Generally, the block 110 may correspond to any block of the processing system 10a requiring configuration data and may correspond to the processing unit 102, a hardware resource 106, or even a memory (e.g. the memory 104a). For example, the block 110 may be a debug interface of the processing system 10a, which is enabled or disabled based on the configuration data CD. Similarly, the configuration data CD may be used to configure read and/or write protected areas of a memory.

For example, in order to distribute the configuration data CD, each block 110 may have associated a respective configuration data client 112. For example, in FIG. 3 are shown three blocks 110a, 110b and 110c and three configuration data clients 112a, 112b and 112c. Generally, each configuration data client 112 may be associated univocally to a single hardware block 110, and provided configuration data only to the associated hardware block 110, e.g. a specific hardware resource 106, or may be associated with a plurality of hardware blocks 110, e.g. a plurality of hardware resource 106. In general, the configuration data clients 112a, 112b and 112c may also be integrated in the respective block 110a, 110b and 110c.

Accordingly, in the embodiment considered, the configuration circuit 108 may determine for each target block 110 to be configured the respective configuration data (selected from the configuration data CD) and transmit the configuration data associated with the target block 110 to the configuration data client 112 associated with the target block 110. Similarly, while reading the configuration data CD from the memory 104, the configuration circuit 108 may determine the target block(s) for the current configuration information and send the current configuration data to the configuration data client(s) associated with the respective target block(s). Generally, any communication may be used for transmitting the configuration data to the configuration data client 112, including both serial and parallel communications. For example, the configuration circuit 108 and the configuration data clients 112 may be connected via a bus 114, and each configuration data clients 112 may have associated a respective target address.

Accordingly, each configuration data client 112 is configured to receive the configuration data from the circuit 108, store them into the internal register, e.g. store them into one or more internal flip-flops or latches. The data stored in the register may then be used to generate one or more signals, which influence the behavior of one or more hardware blocks 110.

Figure 4:
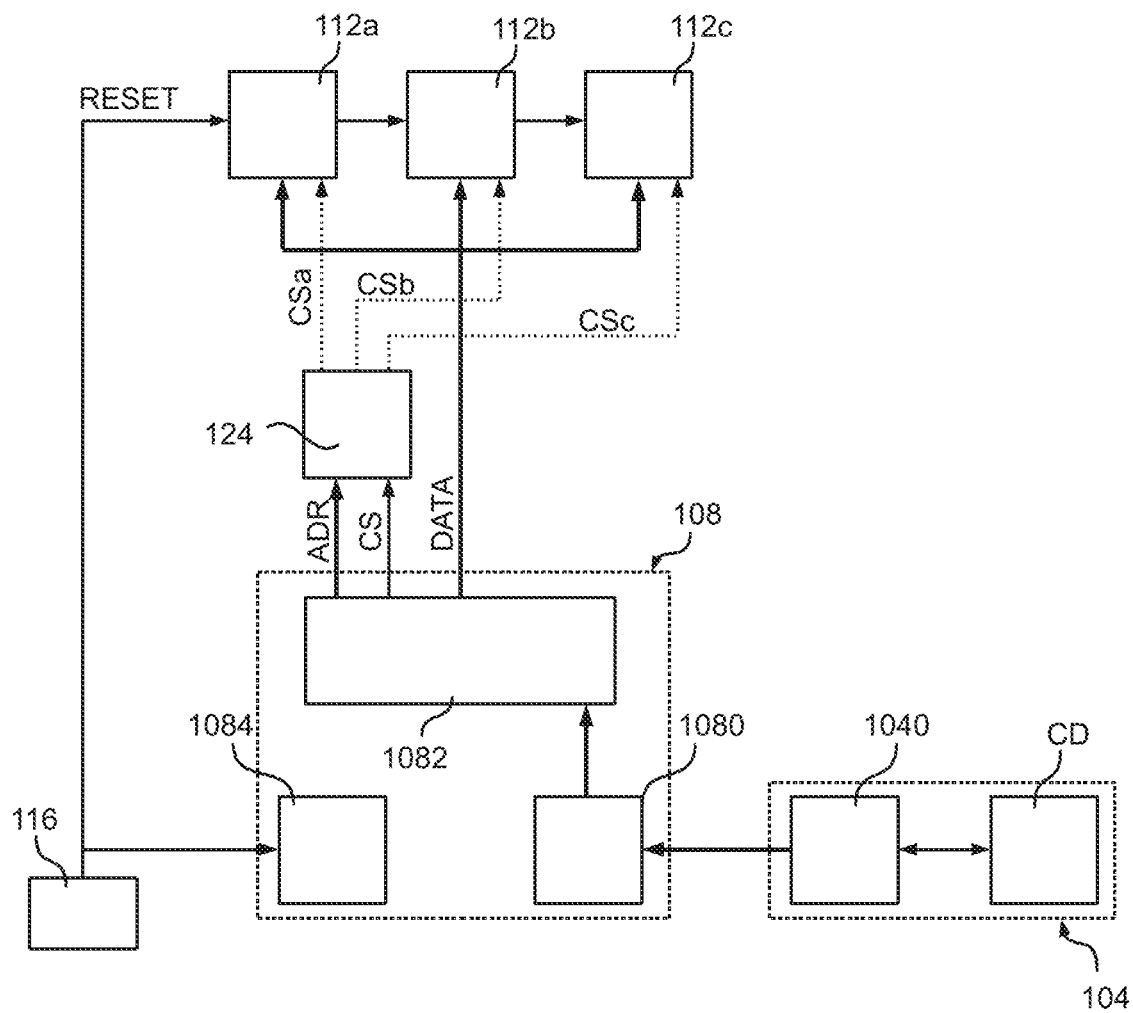
FIG. 4 shows an embodiment of a processing system comprising a configuration circuit and configuration data clients in accordance with the present disclosure.

FIG. 4 shows in this respect a possible embodiment of the communication between the configuration circuit 108 and the configuration data clients 112.

Specifically, also in this case, the processing system 10a comprises a configuration circuit 108 configured to read the configuration data CD from one or more non-volatile memories 104 (e.g., memories 104a and/or 104b) and a plurality of configuration data clients 112 configured to receive respective configuration data from the circuit 108 and distribute them among a plurality of blocks 110 (not shown) requiring configuration data. For example, as mentioned before, each configuration data client 112 may be associated univocally with a respective block 110. For example, in the embodiment considered, the processing system 10a comprises again three configuration data clients 112a, 112b and 112c.

In the embodiment considered, the configuration circuit 108 comprises a data read circuit 1080 configured to read the configuration data CD from the memory 104 and a dispatch circuit 1082 configured to transmit the configuration data to the configuration data clients 112.

As mentioned before, any communication may be used for communication between the dispatch circuit 1082 and the configuration data clients 112. For example, in various embodiments, the communication between the dispatch circuit 1082 and the configuration data clients 112 is based on data frames in accordance with a given format, called in the following Device Configuration Format (DCF). For example, in various embodiments, each data frame comprises two fields: the payload (i.e., the real data), called DCF Format payload, and possible additional data attributes used to identify the receiver of the data, called DCF Format attributes, wherein the receiver is one of the configuration data clients 112 representing a DCF client. For example, the data attributes may consist in 16 or 32 bits, wherein a given number of bits specifies the address of one of the configuration data clients 112, and the payload may consist in 16 or 32 bits. For example, in various embodiments, the data read circuit 1080 is configured to read blocks of 64 bits from the memory 104, wherein the first 32 bits contain the data attributes (including the address of a configuration data client) and the second 32 bits contain the configuration data to be transmitted to the address specified in the data attributes.

As described before, each configuration data client/DCF client 112 may be a hardware module, usually comprising a combinational circuit configured to store the received data in an internal register implemented, e.g., with flip-flops/latches, thereby permitting to distribute, via one or more internal signals generated as a function of the data stored in the internal register, the configuration data received to various parts of the associate hardware block(s) 110. For example, as mentioned before, each configuration data client 112 may have associated a univocal address (i.e., univocal within each processing system 10a) and analyses the data transmitted by the dispatch circuit 1082 in order to determine whether the additional data attributes (DCF Format attributes) contain the address associated with the configuration data client 112.

In various embodiments, the circuit 108 may also comprises a state control circuit 1084 configured to manage the various configuration phases of the processing system 10a.

For example, in various embodiments, once the processing system 10a is switched-on, a reset circuit 116 of the processing system 10a may generate a reset signal RESET, which is used to perform a reset of the various components of the processing system 10a. For example, the reset signal RESET may correspond to a reset pulse of a given number of clock cycles, provided to the blocks 110 of the processing system 10a. For example, in the embodiment considered, the reset signal RESET may be used by the configuration data clients 112 in order to set the internal register to a given reset value.

Similarly, in response to a reset, the state control circuit 1084 may activate the configuration phase. Specifically, during the configuration phase, the data read circuit 1080 may read the configuration data CD from the memory 104 and the dispatch circuit 1082 may send the configuration data CD to the various configuration data clients 112, thereby overwriting the reset values.

For example, in various embodiments, the dispatch circuit 1082 may generate a data signal DATA having a given number of bits (corresponding to the bits of the payload) containing the configuration data to be transmitted to a given configuration data client 112 and further control signals for selecting the target configuration data client 112. For example, in the embodiment considered, the dispatch circuit 1082 generates also an address signal ADR containing the address of the target configuration data client 112 and optionally a chip select signal CS used to signal that the address signal ADR and the data signal DATA are valid.

For example, in various embodiments, the address signal ADR (and the chip select signal CS) may be provided to a decoder 124 configured to activate one of the configuration data clients 112 as a function of the address signal ADD. For example, in the embodiment considered, the decoder 124 may set a chip select signal CSa in order to indicate that the configuration data client 112a should read the data signal DATA when the address signal ADR corresponds to an address assigned to the configuration data client 112a (and the chip select signal CS is set). Similarly, the decoder 124 may set a chip select signal CSb in order to indicate that the configuration data client 112b should read the data signal DATA when the address signal ADR corresponds to an address assigned to the configuration data client 112b (and the chip select signal CS is set), etc.

Accordingly, as mentioned before, the configuration data CD may also comprise security configuration data used to activate or deactivate given security functions of the processing system 10a, such as: the external access to a debug interface; and the (read and/or write) access to given memory locations, etc.

Moreover, as mentioned in the foregoing the configuration data CD may comprise two sub-sets of configuration data: a first group of configuration data (e.g., calibration data) written by the producer of the processing system 10a, e.g. the chip manufacture; and a second group of configuration data written during a later stage, such as configuration data written by the firmware developer and/or a system integrator, such as the producer of an Engine Control Unit (ECU).

In various embodiments, these groups of configuration data are written to different areas of the memory(ies) 104, thereby permitting that these groups may be configured independently.

For example, in this case, the security configuration data included in the first group of configuration data may also permit to set the access rights to the memory locations in which the first group of configuration data are stored. For example, in this way, the first group of configuration data may not be overwritten, and/or the memory interface may inhibit a read access to the first group of configuration data (e.g. the processing unit 102).

Conversely, the security configuration data included in the second group of configuration data may be used to configure the behavior of the blocks 110 from a functional point of view, e.g. in order to enable or disable the debug interface, etc. Thus, also in this case, once the debug interface is deactivated, the second group of configuration data may not be overwritten or read.

Accordingly, as mentioned before, the processing system 10a comprises one or more non-volatile memories 104 to which configuration data CD may be written, e.g. during the production phase. A dedicated configuration circuit 108 is activated during the reset phase of the processing system 10a and the configuration circuit 108 reads the configuration data CD stored in the one or more non-volatile memories 104 and transmits the configuration data CD to the configuration data clients 112. The configuration data clients 112 store the transmitted/distribute configuration data CD and the values stored/latched in the configuration data clients 112 are used by the blocks 110, e.g. by the security framework to regulate the whole security behavior.

Thus, the architecture described in the foregoing has the advantage that configuration data CD may be stored permanently to the one or more memories 104, while some of the configuration data CD may be overwritten by sending new configuration data CD to a configuration data client 112. For example, such a solution is described in the Italian patent application 102017000062830, which is incorporated herein by reference.

Figure 5:
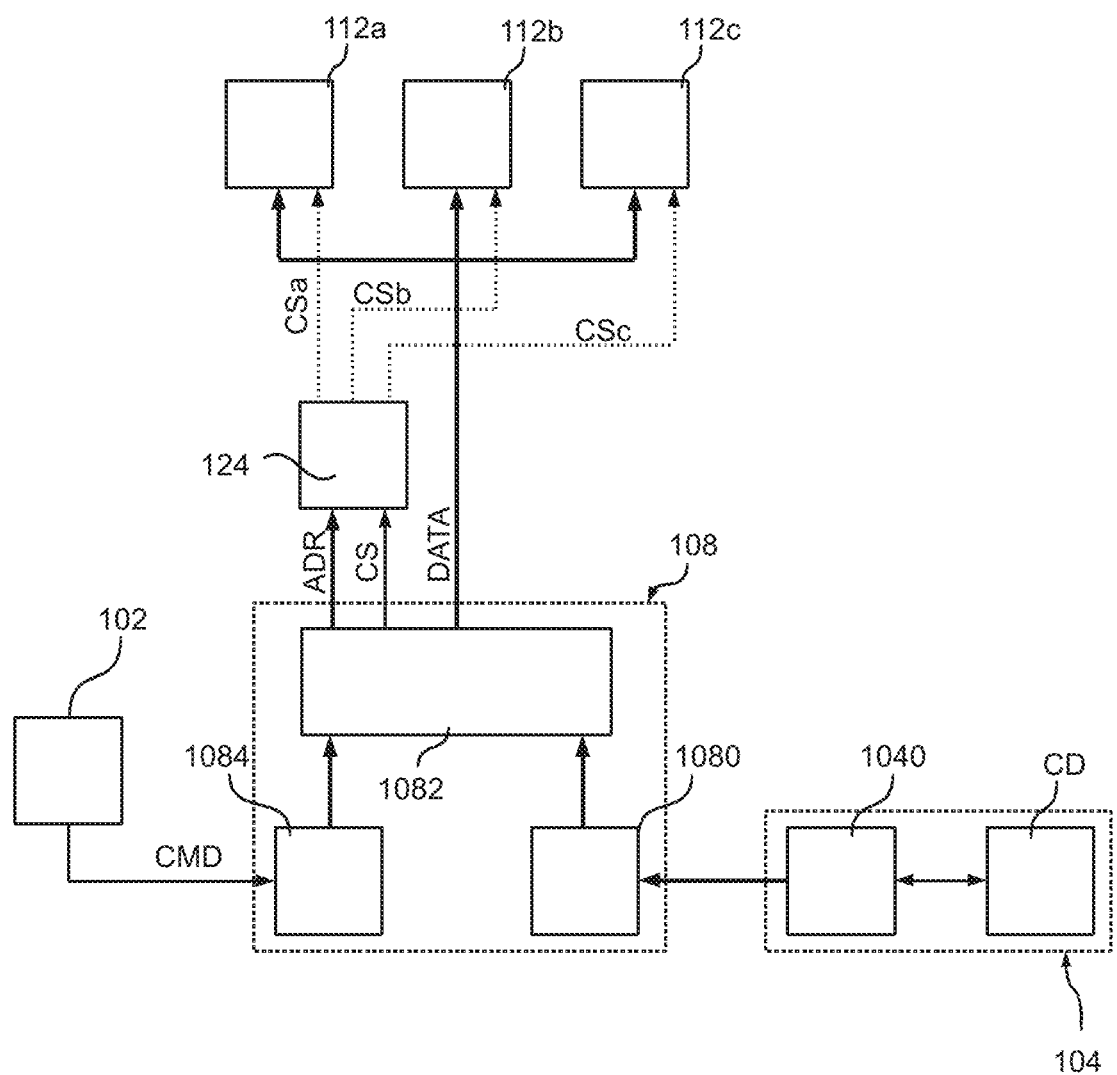
FIG. 5 shows an embodiment of a processing system comprising a configuration circuit enabling a temporary overwriting of the configuration data sent to the configuration data clients.

For example, FIG. 5 shows an embodiment of a configuration circuit 108 configured to support a temporary overwriting of at least part of the configuration data.

Specifically, in the embodiment considered, the state control circuit 1084 is modified in order to support a configuration data overwrite mode.

In the embodiment considered, the circuit 1084 is configured to receive a command CMD. Generally, the command CMD may be provided directly by a communication interface of the processing system 10a. Conversely, in the embodiment considered, the command CMD is generated by the processing unit 102 of the processing system 10a, e.g. the command CMD may be generated by means of software instructions executed by a processing unit 102 of a microcontroller.

Figure 6:
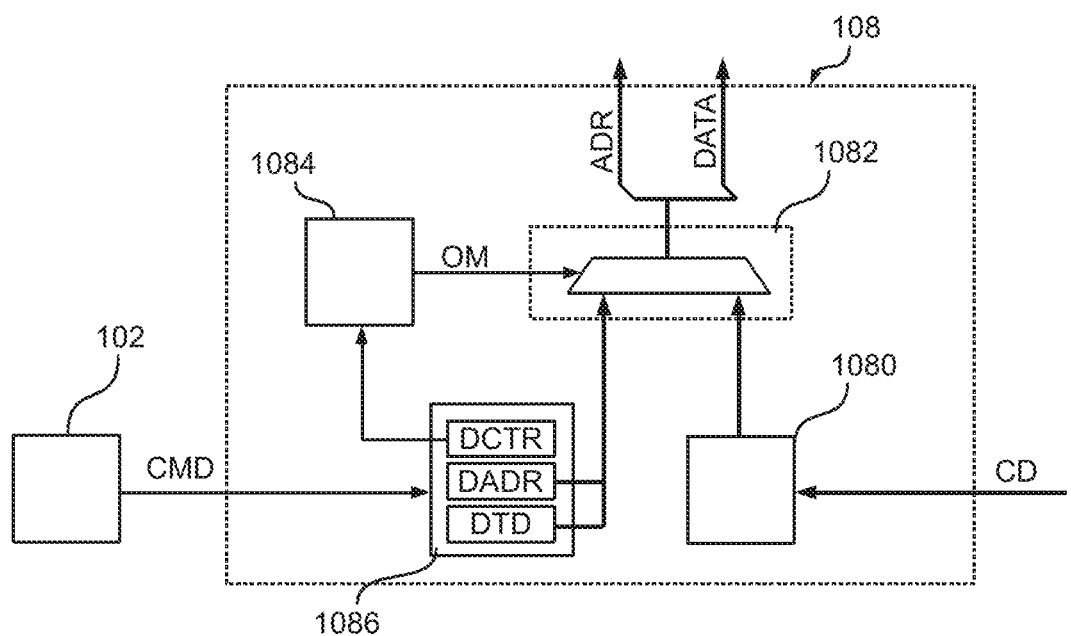
FIG. 6 shows an embodiment of the configuration circuit of FIG. 5.

For example, as shown in FIG. 6, the circuit 1084 may comprise one or more register 1086 addressable by the processing unit 102, so called special function registers of the processing system 10a. In this case, the processing unit 102 may write the content of the registers 1086 associated with the circuit 1084, thereby providing the command CMD to the circuit 1084.

For example, in various embodiments (see FIG. 6), the command CMD contains an address DADR of one of the configuration data clients 112 and updated configuration data DTD to be transmitted to the respective configuration data client 112. Generally, the command CMD may also comprise control information DCTR, which e.g. may indicate that a new operation has to be performed. For example, in various embodiments, the address DADR, the data DTD and the optional control information DCTR are stored in different registers each having associated a respective address.

Accordingly, once the configuration circuit 108 has received the command CMD (e.g., once the address DADR and the data DTD are store in the register 1086), the configuration circuit 108 may send the configuration data included in the command CMD (i.e., the data DTD store in the register 1086) to the respective configuration data client 112.

For example, in the embodiment shown in FIG. 6, the address DADR and the data DTD are provided to the dispatch circuit 1082, which forwards the new configuration data to the configuration data client 112 indicated by the address DADR.

For example, for this purpose, the state control circuit 1084 may monitor the registers 1086, e.g., the control data DCTR, in order to determine whether new configuration data are available in the register 1086. In case new configuration are available in the register 1086, the state control circuit 1084 may generate an overwrite mode signal OM, which signals to the dispatch circuit 1082 that new configuration data should be transmitted to a configuration data client 112. For example, as schematically shown in FIG. 6, the dispatch circuit 1080 may transmit during the configuration phase the configuration data CD read by the data read circuit 1080. Conversely, when the signal OM indicates that the overwrite mode has been activated, the dispatch circuit 1082 may transmit the configuration data DTD stored in the register 1086, e.g., by setting the address signal ADR to the content of the register DADR and the data signal DATA to the content of the register DTD (and possibly generating the chip select signal CS).

Generally, the configuration circuit 108 may also support a configuration data read mode. For example, the overwrite or the read mode may be indicated by the control data DCTR.

For example, in various embodiments, the address of the configuration data client 112 for the read operation is stored again in the register DADR and the configuration data read from the internal register of the configuration data client are stored in the register DTD. However, in general, also separate registers may be used for the read address and/or the data read.

Accordingly, in various embodiments, the register 1086 is accessible via the processing unit 102, e.g., via the software executed by a microprocessor. Moreover, in the embodiment considered, the register 1086 comprises: the register DADR used to store the address of a target configuration data client 112. The register DTD is used to store data to be transmitted to or read from the configuration data client 112. The register DCTR is used to control the read or write operation.

Accordingly, in various embodiments, the register DTD has a number of bits corresponding to the number of bits of the data signal DATA, i.e. the bits of the DCF Format payload, and the register DADR has a number of bits corresponding at least to the number of bits of the address signal ADDR. For example, both registers may have 32 bits.

Accordingly, in various embodiments, the processing unit 102 (e.g., via software instructions) may read/write configuration data from/to one or more of the configuration data clients 112. For example, a write operation may be important to be able to temporarily test different configurations of the configuration data clients 112, including also the security configuration data, thereby permitting a reduction of the development and testing phases. For example, a conventional debug interface may not be used for this purpose, because, once deactivated, the debug interface cannot be used any more to interact with the processing system 10a. Conversely, a read operation may be important to analyze whether a certain configuration data client 112 contains the expected data (for example, in the case of a failure analysis).

In the embodiments considered with respect to FIGS. 5 and 6, the configuration circuit 108 permits that the processing unit 102 may write directly the command CMD into the registers 1086, without any security verification. However, this does not represent per se a security problem. In fact, the processing unit 102 may indeed receive the command CMD via one of the communication interfaces of the processing system 10*a*, e.g. via a CAN bus. Accordingly, the command received via the communication interface may comprise also a keyword/password, and the processing unit 102 may be configured to determine whether the keyword included in the command received corresponds to a reference keyword. Similarly, the command CMD may also be transmitted in encrypted form to the processing unit 102 and the processing unit 102 may decrypt the command (e.g. by using a symmetric or asymmetric encryption algorithm). Accordingly, in general, the processing unit 102 may verify whether indeed the command received via the communication interface should be forwarded to the configuration circuit 108.

In various embodiments, it may however be desirable to limit the read and/or write access provided by the configuration circuit 108. In fact, from a security point of view, the protection of the register interface 1086 should not just rely on higher layer protection mechanism (e.g., CAN or encryption). Accordingly, in various embodiments, the configuration circuit 108 comprises also hardware protections.

Figure 7:
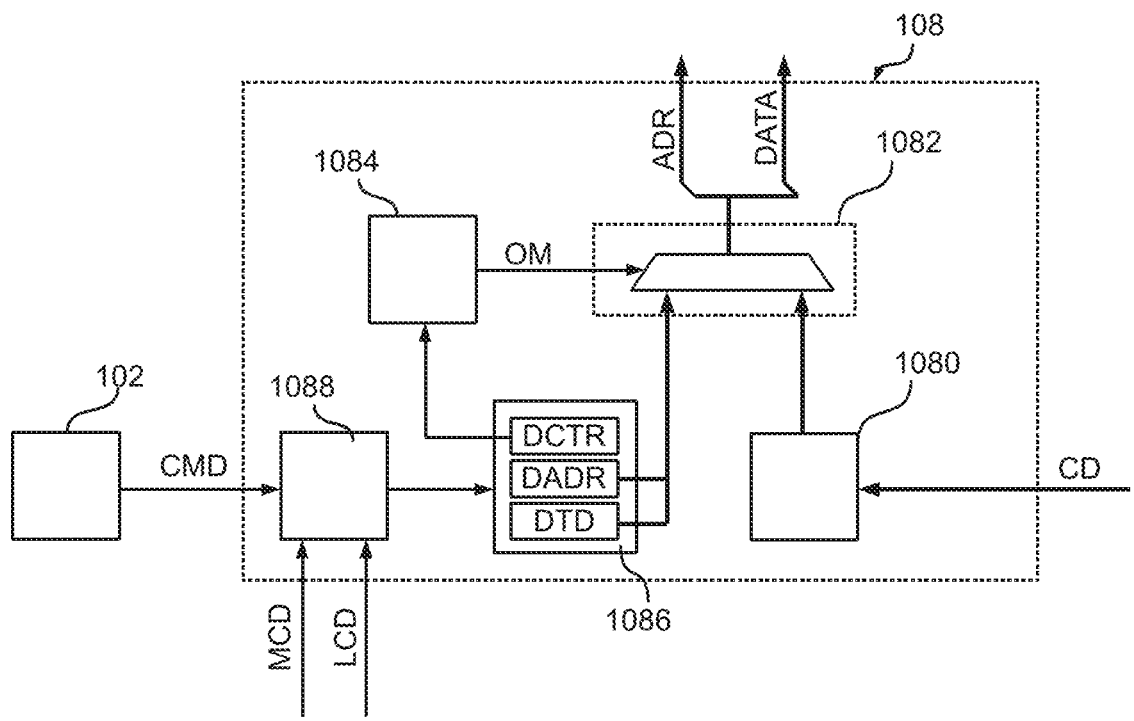
FIG. 7 shows an embodiment of a configuration circuit comprising an access control circuit.

For example, FIG. 7 shows an embodiment of a configuration circuit 108 comprising an access control circuit 1088, which selectively enables access to the register 1086, i.e. enables or inhibits the forwarding of the command CMD to the register 1086. Generally, the access control circuit 1088 may enable or inhibit the execution of the read or write access also in different manner, e.g., by providing a signal to the state control circuit 1084, and the state control circuit 1084 may switch to the overwrite mode or read mode only when the access control circuit 1088 indicates that the access is granted. Instead of controlling access to the register 1086, the access control circuit 1088 may also control whether the content of the register 1086 is forwarded to the dispatch circuit 1082. Thus, generally, the access control circuit 1088, enables or inhibits the forwarding of the command CMD to the register dispatch circuit 1082.

For example, in various embodiments, the hardware access control circuit 1088 may receive at input one or more configuration data, including e.g. mode configuration data MCD and/or life cycle data LCD. For example, in various embodiments, the mode configuration data MCD are stored in the non-volatile memory 104.

Figure 8:
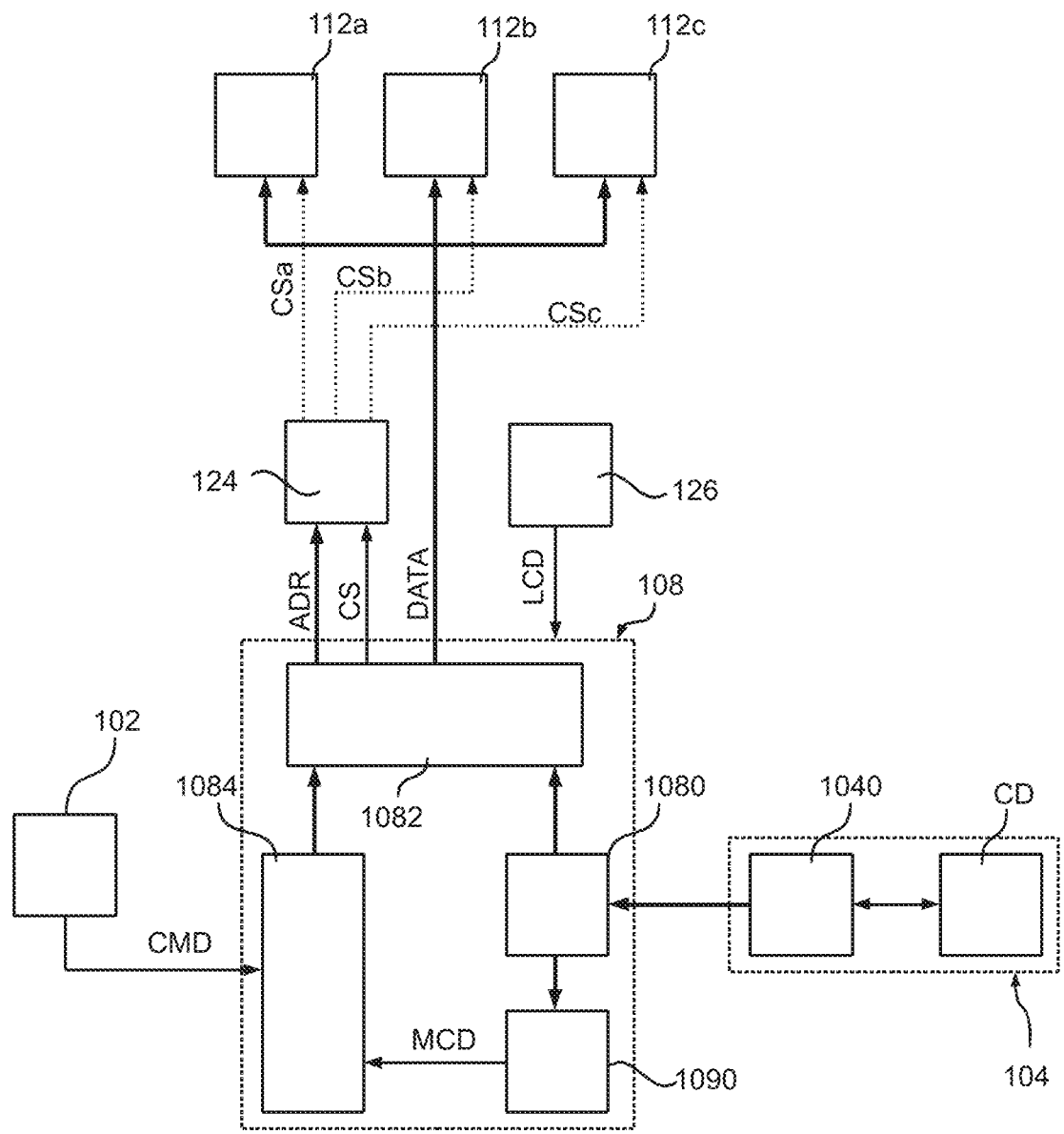
FIGS. 8 and 9 show further embodiments of processing systems wherein mode configuration data and life-cycle data may be used.

For example, FIG. 8 shows an embodiment, in which the mode configuration data MCD are stored at one or more fixed memory locations in the memory 104. In this case, the circuit 108 may read the mode configuration data MCD via the data read circuit 1080 and store them in an internal register 1090. Similarly, also in case the mode configuration data MCD are stored together with the configuration data CD, the circuit 108 may extract the mode configuration data MCD and store them in the internal register 1090.

Figure 9:
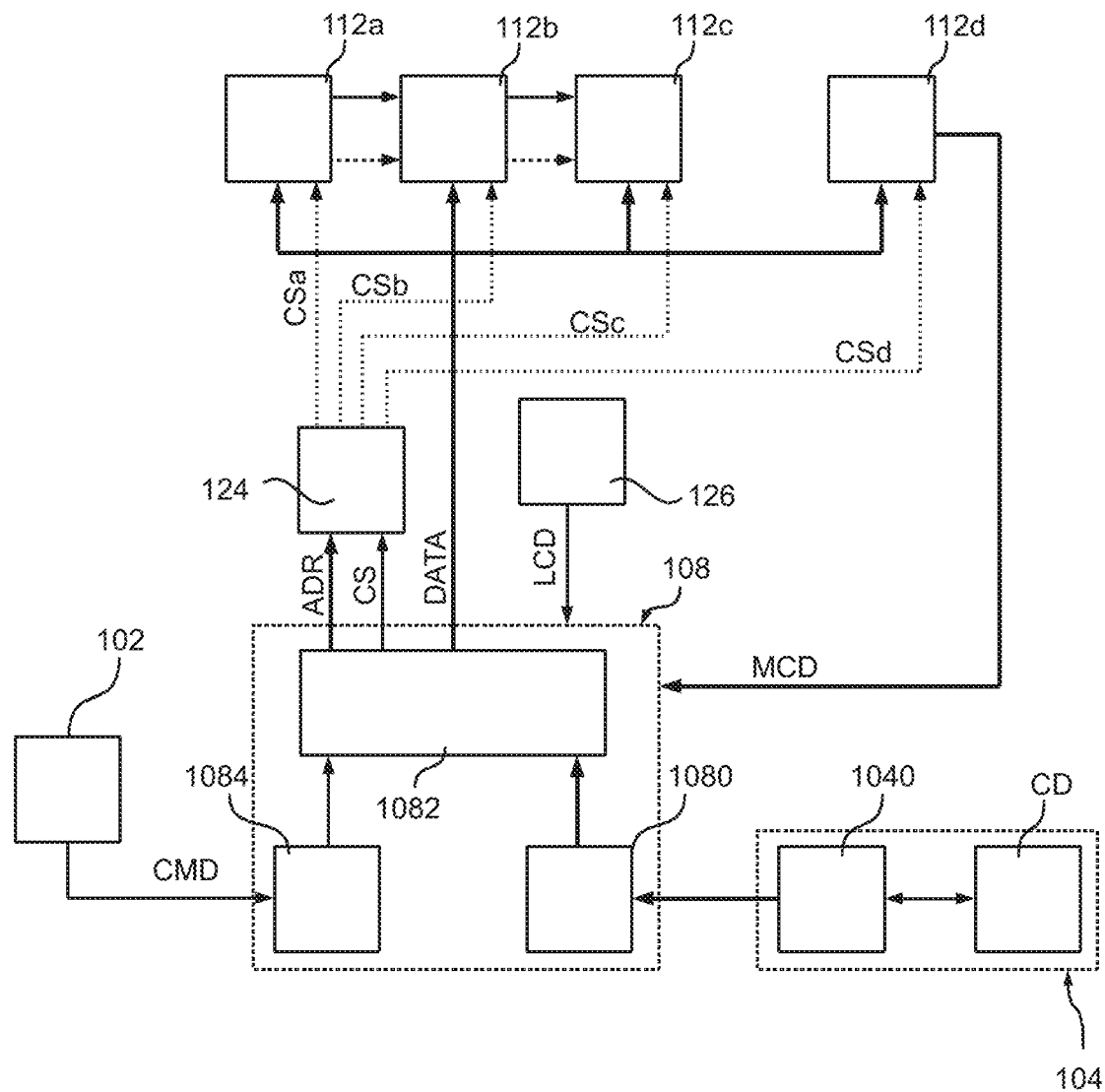

Conversely, FIG. 9 shows an embodiment, in which an additional configuration data client 112*d* is used. Generally, the previous description of the configuration data clients 112 applies also to this client 112*d*. For example, the configuration data client 112*d* is configured to store in an internal register during a reset state a given reset value and overwrite the reset values by storing the data received from the circuit 108. Moreover, when using a bus system, the configuration data client 112*d* may have associated a respective address ADR. For example, in the embodiment considered, the decoder 124 may generate a chip select signal CSd when the address ADR provided by the circuit 108 corresponds to the address associated with the configuration data client 112*d*.

Accordingly, in the embodiment considered, the configuration circuit 108, in particular the dispatch circuit 1082, distributes the configuration data CD read from the memory 104 to the various configuration data clients 112, without knowing that these data include also the mode configuration data MCD. In the embodiment considered, the configuration data client 112*d* represents thus the configuration data client associated with the configuration circuit 108, wherein the configuration data client 112*d* provides the mode configuration data MCD to the configuration circuit 108, e.g., the access control circuit 1088. Accordingly, in the embodiment considered, the circuit 108 passes the mode configuration data MCD read from the memory 104 to the configuration data client 112*d* and receives from the same the stored configuration data, i.e., the mode configuration data MCD.

Accordingly, in various embodiments, the mode configuration data MCD may be written by the firmware developer of the processing system. For example, in various embodiments, the mode configuration data MCD permit to specify: overwrite mode is enabled; or overwrite mode is disabled (which may correspond to the default value).

Conversely, the life cycle data LCD indicate the life cycle of the product. The life cycle is a permanent signature written into a non-volatile memory, which determines the stage of the processing system 10*a* during its life-time. For example, the life cycle may be encoded with a bit sequence. In various embodiments, this bit sequence is stored in a separate non-volatile memory 126 (see e.g. FIG. 9), preferably a one-time programmable memory. In general, the life cycle data LCD may also be stored at reserved memory locations of the memory 104.

For example, in various embodiments, the bit sequence LCD stored in the memory 126 may indicate one of the following stages:

"production" (LC1), when the processing system 10*a*, e.g. a micro-controller, is in the chip fabric;

"customer delivery" (LC2), when the processing system 10*a* has been shipped to the 1st tier customer (e.g., a producer of an engine control unit);

"OEM production" (LC3), when the device has been shipped to a next-level customer (e.g., a car maker);

"in field" (LC4), when the device is installed in the final product (e.g. in a car sold in the market);

"failure analysis" (LC5), when the device is shipped back to producer of the processing system 10*a* or the software developer for diagnostic purposes.

In various embodiments, the life cycle data LCD is written such that once a certain stage is reached, it is not possible to revert it back to a previous stage, i.e., the life cycle can only advance. For example, this may be implemented with a one-hot encoding in which a fuse is burned each time a given stage has been reached. For example, the advancing of the life cycle to the next stage may be done by the entity who owns the device in the current life cycle stage (e.g., chip producer will advance the life cycle when it is shipped to the customer delivery stage; the 1st tier customer will advance the life cycle when it is shipped to the OEM production stage, etc.).

The inventor has observed that, from a security point of view, it may be advantageous that the read and/or write access to the configuration data depends also on the life cycle of the product. For example, during the production stage (LC1) and firmware development stage (LC2) read and write access to the configuration data may be permitted. Conversely, once the programmed processing unit 10*a* has been delivered (LC3 and LC4) access to the configuration data should be inhibited. Finally, during a failure analysis (LC5), access to the configuration data should (at least in part) be possible again.

In various embodiments, the access control circuit 1088 is thus configured to enable access to the configuration data as a function of both the mode configuration data MCD (access enabled or disabled) and the life cycle data LCD (LC1 . . . LC5). For example, the following table provides an overview of an embodiment of the access control enforced by the access control circuit 1088:

| LCD | MCD | ACCESS |
|---|---|---|
| LC1 | — | ENABLED |
| LC2 | ENABLED | ENABLED |
| LC2 | DISABLED | DISABLED |
| LC3, LC4 | — | DISABLED |
| LC5 | ENABLED | ENABLED |
| LC5 | DISABLED | DISABLED |

In various embodiments, the access control circuit 1088 may also verify one or more further conditions.

For example, in various embodiments the access control circuit 1088 may monitor a pin, usually indicated as test pin, in order to decide whether the access may be enabled or not. For example, access may be disabled when the test pin is set to the logic level low, while access may by enabled as a function of the mode configuration data MCD and/or the life cycle data LCD (as described in the foregoing) when the test pin is set to the logic level high.

The access control circuit 1088 may also take into account the type of configuration data to be accessed. For example, access to security related configuration data (such as encryption keys) may only be possible during the stages LC1 and LC2 (possibly taking into account the mode control data MCD), while in the remaining stages (including also the stage LC5), access may be inhibited. Accordingly, when the device is in the failure analysis stage (LC5) certain configuration data may be read and/or written while other cannot, wherein the distinction may be based on the fact whether the configuration data are security relevant or not. The classification of the configuration data as security relevant or not-security relevant is evidently device dependent. For example, this may be implemented by using two instances of configuration circuits 108: a first configuration circuit 108 for the security relevant configuration data (i.e., a first set of configuration data) and a second configuration circuit 108 for the not-security relevant configuration data (i.e., a second set of configuration data). In this case, the access control circuit 1088 of the first configuration circuit 108 may also block the access when the life cycle data LCD indicate the stage LC5 (e.g., this may be obtained by removing the input LC5 from FIG. 10).

Generally, also a single configuration circuit 108 may be used. In this case, before executing an access, the configuration circuit 108 may:

a) verify whether the device is in the failure analysis stage (LC5), and b) in case the device is in the failure analysis stage (LC5), determine whether the target address stored in the register DADR corresponds to the address of a configuration data client 112 storing security relevant configuration data.

In fact, in general the access control circuit 1088 may also enable or disable access to the configuration data as a function of the address of the target configuration data client 112.

Accordingly, in various embodiments, access to one or more configuration data clients 112 (e.g., those storing security-relevant data) may be inhibited selectively, e.g., when the life cycle is set to failure analysis stage. The reason to give this flexibility during the failure analysis is again a trade-off between testability and security: it may be accepted that some configuration data can be read out or altered on-the-fly via software to enable the possibility to make some specific test, but it is not allowed to change the programmed security configuration and/or read it back.

Accordingly, the solutions described in the foregoing improve the flexibility of testing and firmware development for the security architecture. In various embodiments, during the initial testing and development stages (LC1 and LC2) it is possible to simulate the behavior of different configuration scenarios stages without the need to physically use different units for each test or development scenario. In various embodiments, the solution adopted does not compromise the overall security as it allows the feature only for those life cycle stages where the security protections are less relevant. In addition, in various embodiments, the content stored by the configuration data clients may be read, which is an important feature during the failure analysis stage.

Thanks to the use of configuration data CD being stored in the non-volatile memory 104 and possibly also the optional overwrite interface/register 1086 in the form of data packets/DCF frames, the dispatch circuit 1082 may simply forward the packets to the corresponding configuration data client 112 indicated in the attribute field of the data packet/DCF frame.

For example, a first configuration data client 112 may store configuration data CD, which signal to a memory of the processing system 10*a*, such as the memory 104, whether to enable or disable a write and/or read protection associated with one or more memory blocks of the memory. Similarly, a second configuration data client 112 may store configuration data used to generate a signal controlling the access to a debug interface. Accordingly, the associated blocks no do not use directly the configuration data CD stored in the non-volatile memory 104 but the configuration data stored in the configuration data client 112.

As mentioned before, the respective configuration data CD are stored as data packets/DCF frames in one or more reserved memories of at least one non-volatile memory 104. Specifically, in various embodiments a single non-volatile memory 104 may be used and the data packets/DCF frames may be stored consecutively one after the other. In various embodiments, the configuration data programmed to the non-volatile memory 104 may not include necessarily configuration data CD for all configuration data clients 112 but only the configuration data CD which are different from the default/reset values (see also the description of FIG. 4). For example, in this way, the producer of the processing system 10*a* may store a first set of configuration data CD to the non-volatile memory and a software developer may store a second set of configuration data to the non-volatile memory by appending the new configuration data to the first set of configuration data. Similarly, also the system developer, e.g. the producer of an ECU, may set a third set of configuration data by appending further configuration data to the second set of configuration data.

Generally, due to the fact that the configuration data CD stored in the one or more non-volatile memories 104 may also be used to control the various security features of the processing system 10*a*, it is advantageous that the programmed configuration data CD cannot be altered anymore. For example, in various embodiments, each non-volatile 104 may be configured to inhibit write accesses to already programmed memory locations of the memory area(s) which may comprise configuration data, i.e., the non-volatile memory area(s) where the configuration data may be stored cannot be erased or re-programmed, thereby ensuring that configuration data CD already stored in the one or more non-volatile memories 104 may be altered within the non-volatile memory 104.

Accordingly, in various embodiments, the configuration circuit 108 reads these data packets/DCF frames from the non-volatile memory 104 during the reset phase. Specifically, in various embodiments, the configuration circuit 108, in particular the data read circuit 1080, starts the read operation from a start address of the memory 104 (which may be fixed or programmable) and continuous the reading operation until the last data packets/DCF frame has been read from the non-volatile memory 104. Generally, the data read circuit 1080 may also access a plurality of non-volatile memories 104, or generally a plurality of memory areas which may belong to one or more non-volatile memories 104. For example, a first memory area may be programmable only by the producer of the processing system 10*a* and a second memory area may be programmable by the software and/or system developer.

In various embodiments, each data packet/DCF frame read from the non-volatile memory 104 is provided to the dispatch circuit 1082, which forwards the configuration data CD included in the data packet/DCF frame, in particular the payload, to a respective configuration data client 112. For example, as mentioned before, the data packet/DCF frame may include an attribute field comprising data specifying a target configuration data client 112, such as directly the address ADR of a configuration data client 112. Thus, the dispatch circuit 1082 uses the attribute field in order to forward the payload, i.e. the configuration data, to the respective target configuration data client 112, e.g. by using the signal ADR (and possibly the signal CS) described with respect to FIG. 4. However, also any other communication may be used in order to forward the payload to the respective configuration data client 112, including both serial and parallel communications.

Accordingly, the configuration data CD may be stored during the various production and development phase as a sequence of consecutive data packets/DCF frames. However, this implies that, in case the one or more non-volatile memories 104 contain two or more data packets/DCF frames, which are addressed to the same configuration data client 112, the configuration data circuit 108 will transmit sequentially the respective configuration data of these two or more data packets/DCF frames to the same configuration data client 112, and the configuration data client 112 will overwrite the previous values, i.e., the configuration data client 112 will only provide the last configuration data having been received.

Generally, such a behavior may be desirable or harmful.

For example, the use of plural DCF frames addressed to the same configuration data client 112 may be useful in order to permit a recalibration of the processing system, e.g. by appending a DCF frame with new calibration data to the already existing configuration data CD in the non-volatile memory 104. In fact, in this way, the various calibration data will be read during the reset phase, but the respective configuration data client 112 will only use the calibration data programmed last.

Conversely, it may be rather dangerous when already activated security and/or safety functions could be deactivated by simply appending respective configuration data CD to the non-volatile memory 104.

Accordingly, in various embodiments, each configuration data client 112 may be either: a configuration data client permitting only a single write operation of configuration data CD read from the one or more non-volatile memory 104; or a configuration data client permitting a plurality of write operations of configuration data CD read from the one or more non-volatile memory 104.

In various embodiments, the configuration data client of the first type may however still overwrite the configuration data when these configuration data are provided via the optional overwrite interface 1086. For example, the signal OM described with respect to FIG. 6 may also be used to signal to the configuration data clients 112 whether the new configuration data CD have been provided: via the data read circuit 1080, i.e., the configuration data CD have been read from the one or more non-volatile memory 104; or via the (temporary) overwrite interface 1086.

Accordingly, in various embodiments, each configuration data client 112 may apply the above configuration: to all configuration data CD received; or only to the configuration data CD read from the one or more non-volatile memory 104.

Generally, the selection for each configuration data client 112 may be static and fixed at a hardware level during the design stage of the processing system 10*a*, or programmable, e.g. by using the previously described mode configuration data MCD and/or life cycle data.

Accordingly, the first type of configuration data client 112 will only store/latch the first configuration data CD received and any further write operation will be disregarded. For example, in this way, a memory area of the non-volatile memory 104 may be permanently marked as non-writable.

Conversely, the second type of configuration data client 112 will store/latch all configuration data CD received and provide always the configuration data having been received at last. For example, in this way, a protection flag might be defined and used to globally enable or disable "in one shot" a group of protections.

Figure 10:
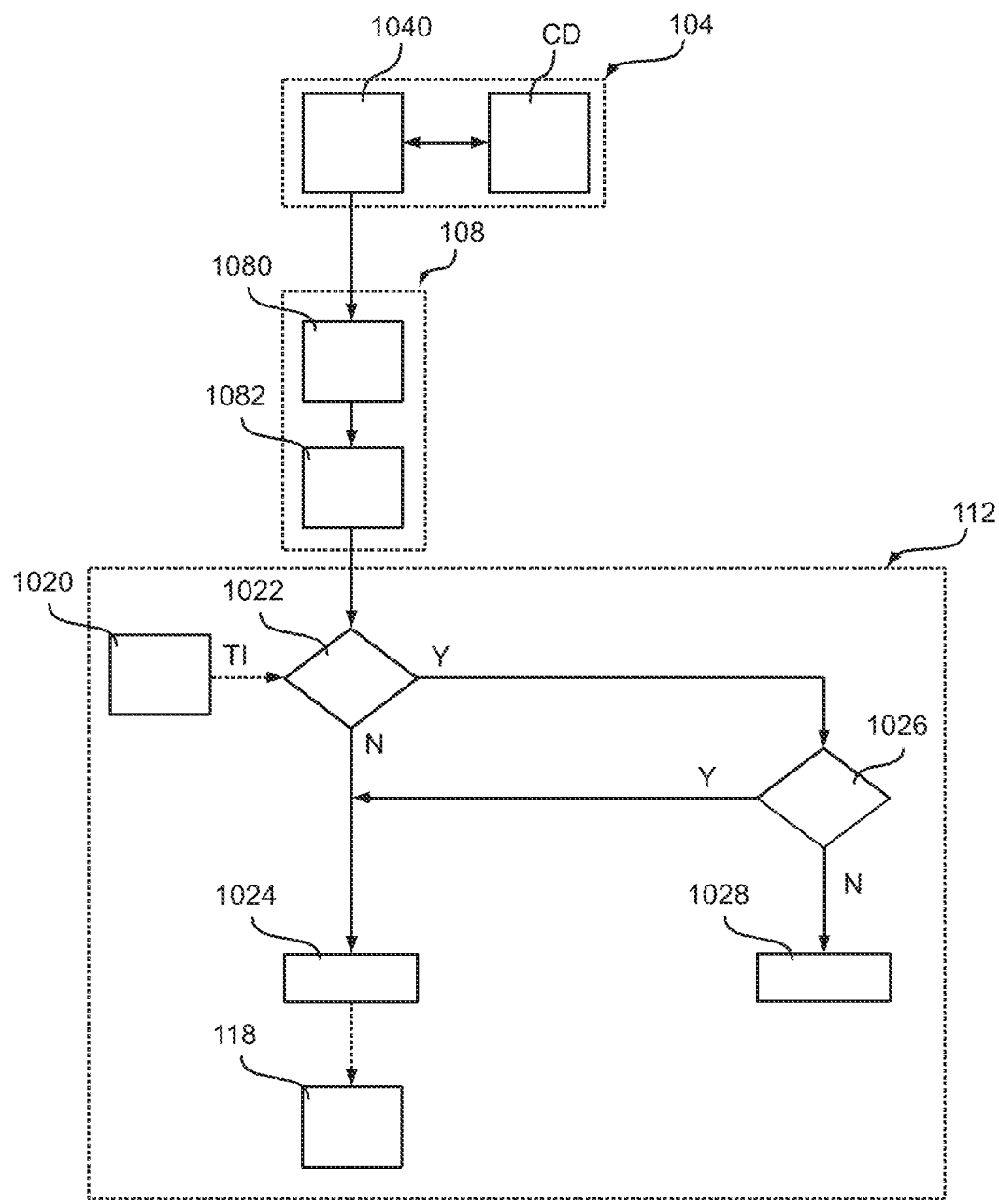
FIG. 10 shows a first embodiment of a configuration circuit and a configuration data client.

FIG. 10 shows a first embodiment of the configuration circuit 108 and a configuration data client 112.

As mentioned before, the configuration circuit 108 is configured (via the data read circuit 1080 and the dispatch circuit 1082) to read configuration data CD from the one or more non-volatile memories 104 and distribute the configuration data read to the various configuration data clients 112, e.g. by using the signals ADR, CS and DATA (see also the description of FIG. 4).

In the embodiment considered, each configuration data client 112 may be configured as: a configuration data client permitting only a single write operation of configuration data CD read from the one or more non-volatile memory 104; or a configuration data client permitting a plurality of write operation of configuration data CD read from the one or more non-volatile memory 104.

For example, in FIG. 10 is shown a type identification unit 1020 configured to provide a type identification signal TI identifying the type of the configuration data client 112. For example, in various embodiments, the type identification unit 1020 is set during the design stage of the processing system 10*a*. For example, configuration data clients 112 being arranged to store security related configuration data are usually of the first type (single write operation permitted).

Accordingly, in the embodiment considered, each configuration data client 112 verifies in a step 1022 whether the type identification signal TI indicates that the configuration data client 112 permits only a single write operation or plural write operations. For example, in various embodiments, the type identification signal TI is a binary signal, wherein one of the logic levels indicates the first type and the other of the logic levels indicates the second type.

In case the configuration data client 112 permits plural write operations (output "N" at the verification step 1122) the configuration data client 112 stores in a step 1024 the configuration data received into an internal register/latch 118. The content of the register/latch 118 is then used to generate the signals used to control the one or more associated blocks 110.

Conversely, in case the configuration data client 112 permits only a single write operation (output "Y" at the verification step 1022) the configuration data client 112 proceeds to a step 1126 where the configuration data client 112 verifies whether the configuration data client 112 has received configuration data for the first time since the processing system 10a has been started, e.g. since the system has been reset via the reset signal RESET.

In case the configuration data client 112 receives the first configuration data (output "Y" at the verification step 1026), the configuration data client 112 may proceed to the step 1024 for storing the configuration data received.

Conversely, in case the configuration data client 112 receives following configuration data (output "N" at the verification step 1026), the configuration data client 112 may proceed to the step 1028, in which the configuration data client 112 inhibits the storage of the configuration data received.

In the embodiment considered, the type identification unit 1020 provides thus a type information signal TI specifying the type of the configuration data client 112. For example, in various embodiments, the type identification unit 1020 may provide a fixed value, e.g. by means of a hardwiring fixed during the design/production of the configuration data client 112. Generally, the above selection of the type of the configuration data client 112 may be performed also directly by a hardwiring within the configuration data client 112, i.e.: a configuration data client permitting only a single write operation of configuration data CD may only implement the steps 1026, 1024 and 1028; and a configuration data client permitting a plurality of write operation of configuration data CD may only implement the step 1024.

The configuration data client 112 that belong to the first type have the drawback that, once a respective set of configuration data CD has been stored to the non-volatile memory 104, the respective configuration data CD loaded during the reset phase cannot be changed anymore. However, the security framework usually includes a significant amount of protections and most of them should have associated the first type of configuration data clients. In fact, such configuration data clients 112 should permit only a single configuration, rendering it almost impossible to test multiple different configurations of protections. Accordingly, multiple processing systems 10a have to be used to test the security configurations, thereby having a negative impact in terms of time and costs. Moreover, automatic testing of the processing system 10a may hardly be implemented.

Accordingly, in various embodiments, the type identification unit 1020 may provide a type identification signal TI having a programmable value, i.e. programmable once the processing system 10a has been produced.

For example, in various embodiments, the type identification unit 1020 may be configured to determine the type identification signal TI as a function of one or more bits of the mode configuration data MCD and/or the life-cycle data LCD described in the foregoing.

Additionally or alternatively, the type identification unit 1020 may generate the type identification signal TI as a function of one or more bits in the register/latch 118 of the respective configuration data client 112. For example, in this way, by activating a given security feature, the respective configuration data client 112 may automatically change from the second type to the first type, thereby neglecting any further write operations.

Figures 11, 12:
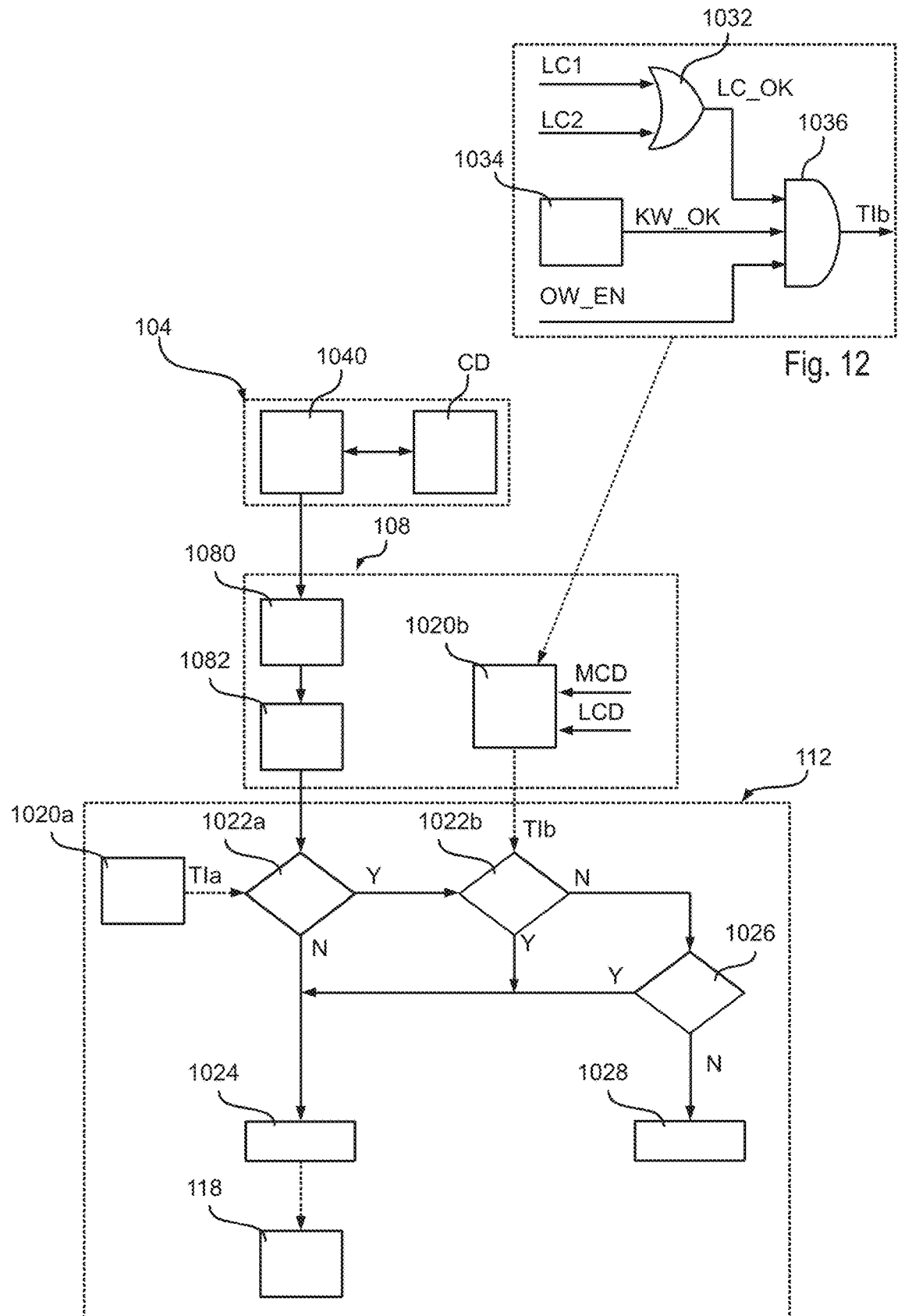
FIGS. 11 and 12 show a second embodiment of a configuration circuit and a configuration data client.

For example, FIG. 11 shows an embodiment wherein the type identification unit 1020 has been split into two type identification units 1020a and 1020b.

In the embodiment considered, the first unit 1020a provides a first bit TIa of the type identification signal indicating (similar to what has been described with respect to the signal TI in FIG. 10) the type of the configuration data client 112.

Conversely, the second unit 1020b provides a second bit TIb of the type identification signal indicating whether a configuration data client 112 of the first type should be overwritten, i.e. whether a configuration data client permitting only a single write operation should permit plural write operation.

Similarly, the step 1022 has been split into two verification steps 1022a and 1022b. Specifically, in a step 1022a the configuration data client 112 may verify whether the type identification signal TIa indicates that the configuration data client 112 permits plural write operations (e.g., when TIa="1").

In case the configuration data client 112 permits plural write operations (output "N" at the verification step 1022a) the configuration data client 112 stores in the step 1024 the configuration data received into the internal register/latch 118.

Conversely, in case the configuration data client 112 does not permit plural write operation (output "Y" at the verification step 1022a) the configuration data client 112 proceeds to the step 1022b where the configuration data client 112 verifies whether the type identification signal TIb indicates that the overwrite mode is enabled (e.g., when TIb="1") or disabled (e.g., when TIb="0").

In case the overwrite mode is enabled (output "Y" at the verification step 1022b) the configuration data client 112 stores in the step 1024 the configuration data received into the internal register/latch 118.

Conversely, in case the overwrite mode is disabled (output "N" at the verification step 1022b) the configuration data client 112 proceeds to the step 1126 where the configuration data client 112 verifies whether the configuration data client 112 has received configuration data for the first time since the processing system 10a has been started, e.g. since the system has been reset via the reset signal RESET.

In case the configuration data client 112 receives the first configuration data (output "Y" at the verification step 1126), the configuration data client 112 may proceed to the step 1024 for storing the configuration data received.

Conversely, in case the configuration data client 112 receives following configuration data (output "N" at the verification step 1026), the configuration data client 112 may proceed to the step 1028, in which the configuration data client 112 inhibits the storage of the configuration data received.

Accordingly, from a practical point of view, the type information signal TI corresponds now to a bit sequence (comprising the bits TIa and TIb, or generally a plurality of bits), wherein the bit sequence indicates whether: the respective configuration data client 112 permits only a single write operation of configuration data CD read from the one or more non-volatile memory 104; or the respective configuration data client 112 permits a plurality of write operation of configuration data CD read from the one or more non-volatile memory 104.

For example, only when TIa="0" (configuration data client should permit only a single write operation) and TIb="0" (overwrite mode disable), the configuration data client may be configured as the first type of client. In all other cases, the configuration data client is configured as the second type, because either the configuration data client is already of the second type (TIa="1"), or the overwrite mode is enabled (TIb="1").

The separation into a plurality of bits has the advantage that, while the bit TIa may be fixed and hardwired, at least the bit TIb may be programmable. For example, in FIG. 11 is shown that the unit loath may determine the bit TIb as a function of the mode configuration data MCD and/or the life cycle data LDC described in the foregoing.

Generally, in case the bit TIa is fixed, the verification block 1022a may be omitted and: a configuration data client which should only permit a single write operation of configuration data CD may only implement the steps 1022b, 1024 and 1026; and a configuration data client permitting a plurality of write operation of configuration data CD may only implement the step 1024.

Accordingly, by performing a suitable programming operation also a configuration data client 112 which is arranged to permit only a single write operation may be re-configured via the signal TIb to bypass the write protection and permit plural write operation, thereby providing the necessary flexibility, e.g., to test and validate different security configuration.

In various embodiments, a single type identification unit 1020b is used for the whole processing system 10a. For example, the type identification unit 1020b may be implemented within the configuration circuit 108. Accordingly, the signal TIb signals to all configuration data clients supporting an overwrite mode (step 1022b described in the foregoing) whether the overwrite mode should be enabled or not.

For example, FIG. 12 shows a possible implementation of the type identification unit 1020b.

Specifically, in the embodiment considered, the type identification unit 1020b determines the bit TIb at least as a function of the life-cycle data LCD indicating the current life cycle. For example, in various embodiments, the overwrite mode may only be activated when the life-cycle data LCD indicate that the current life cycle is in one of the following two stages:

"production" (LC1), i.e., when the processing system 10a, e.g. a micro-controller, is in the chip fabric;

"customer delivery" (LC2), i.e., when the processing system 10a has been shipped to the 1st tier customer (e.g., a producer of an engine control unit);

For example, in the embodiment considered, the type identification unit 1020b receives at input two control signals LC1 and LC2 indicating whether the life cycle is set to the production stage (LC1) or firmware development, respectively. In the embodiment considered, the signals are provided to a logic gate 1032 (e.g. an OR gate) which thus provides a signal LC_OK indicating whether the life cycle is set to the production stage (LC1) or firmware development (LC2).

In various embodiments, the signal LC_OK at the output of the OR gate 1032 may thus be used directly as signal TIb.

However, generally, the type identification unit 1020b may also verify further conditions.

For example, in FIG. 12 is shown a password/keyword verification circuit 1034. For example, in various embodiments the keyword verification circuit 1034 may generate a keyword verification signal KW_OK by verify whether a keyword provided to the circuit 1034 corresponds to a reference keyword. For example, in various embodiments, the reference keyword is hardwired and the current keyword may be provided via the mode configuration data MCD, e.g. the mode configuration data of the configuration circuit 108 (see also the description of FIGS. 8 and 9). Accordingly, in various embodiments, the keyword to be verified may be provided to the keyword-verification circuit 1034 by storing the keyword together with the configuration data CD in the non-volatile memory 104.

Accordingly, in this way the signal TIb may be generated by taking into account both the life-cycle data LCD and a password/keyword verification. For example, by providing the signal LC_OK at the output of the OR gate 1032 and the password verification signal KW_OK at the output of the keyword verification circuit 1034 to a logic gate 1036 (e.g., an AND gate), the signal TIb at the output of the gate 1036 indicates that the overwrite mode is activated when the processing system 10a is the life-cycle stages LC1 or LC2, and the correct password/keyword has been provided to the circuit 1034. However, in general, the password verification operation may also not be required during the stage LC1.

Specifically, in the embodiment considered, once the correct keyword has been provided to the circuit (e.g. by storing the correct keyword to the non-volatile memory 104, which are then read by the configuration circuit 108 and provided as mode configuration data MCD to the verification circuit 1134) the password verification indicates permanently for all configuration data clients 112 that the keyword is correct. In this case, during the stages LC1 and LC2, the overwrite mode will be enabled for all configuration data clients supporting the overwrite mode (step 1022b). However, by advancing the life-cycle from the stages LC1 and LC2 to a further stage, the overwrite mode will be automatically disabled.

In various embodiments, the type identification unit 1020b may also verify whether a global overwrite enable flag OW_EN is set, e.g. by feeding the flag to the input of the AND gate 1036. Accordingly, the global overwrite enable flag OW_EN may be used to disable the overwrite mode for the complete processing system 10a. For example, in various embodiments, the overwrite enable flag OW_EN may be set during the design phase, e.g. by means of a hardwiring, thereby permitting to tailor the design to different products and security needs.

Accordingly, in various embodiments, by using the type units 1020a and 1020b, a configuration data client 112 may have the following configuration:

| LCD | KW_OK | TIa | 1$^{st}$ time writing? | Store CD? |
|---|---|---|---|---|
| LC1 OR LC2 | 0 | 1 | — | Yes |
| | | 0 | Yes | Yes |
| | | | No | No |
| | 1 | — | — | Yes |
| other | — | 1 | — | Yes |
| | | 0 | Yes | Yes |
| | | | No | No |

Generally, as mentioned before, the configuration based on the signal TIa may be implemented also by means of a hardwiring. According the above table may be reduced to the programmable configurations of a configuration data client supporting the overwrite mode (step 1022*b* described in the foregoing):

| LCD | KW_OK | 1st time writing? | Store CD? |
|---|---|---|---|
| LC1 OR LC2 | 0 | Yes | Yes |
|  |  | No | No |
|  | 1 | — | Yes |
| other | — | Yes | Yes |
|  |  | No | No |

Accordingly, the above modification permits to transform a configuration data client supporting only a single write operation into a configuration data client supporting multiple write operations when specific conditions are met.

Similarly, it may be useful to provide a mechanism permitting to transform a configuration data client 112 supporting multiple write operations into a configuration data client supporting only a single write operation.

Figure 13:
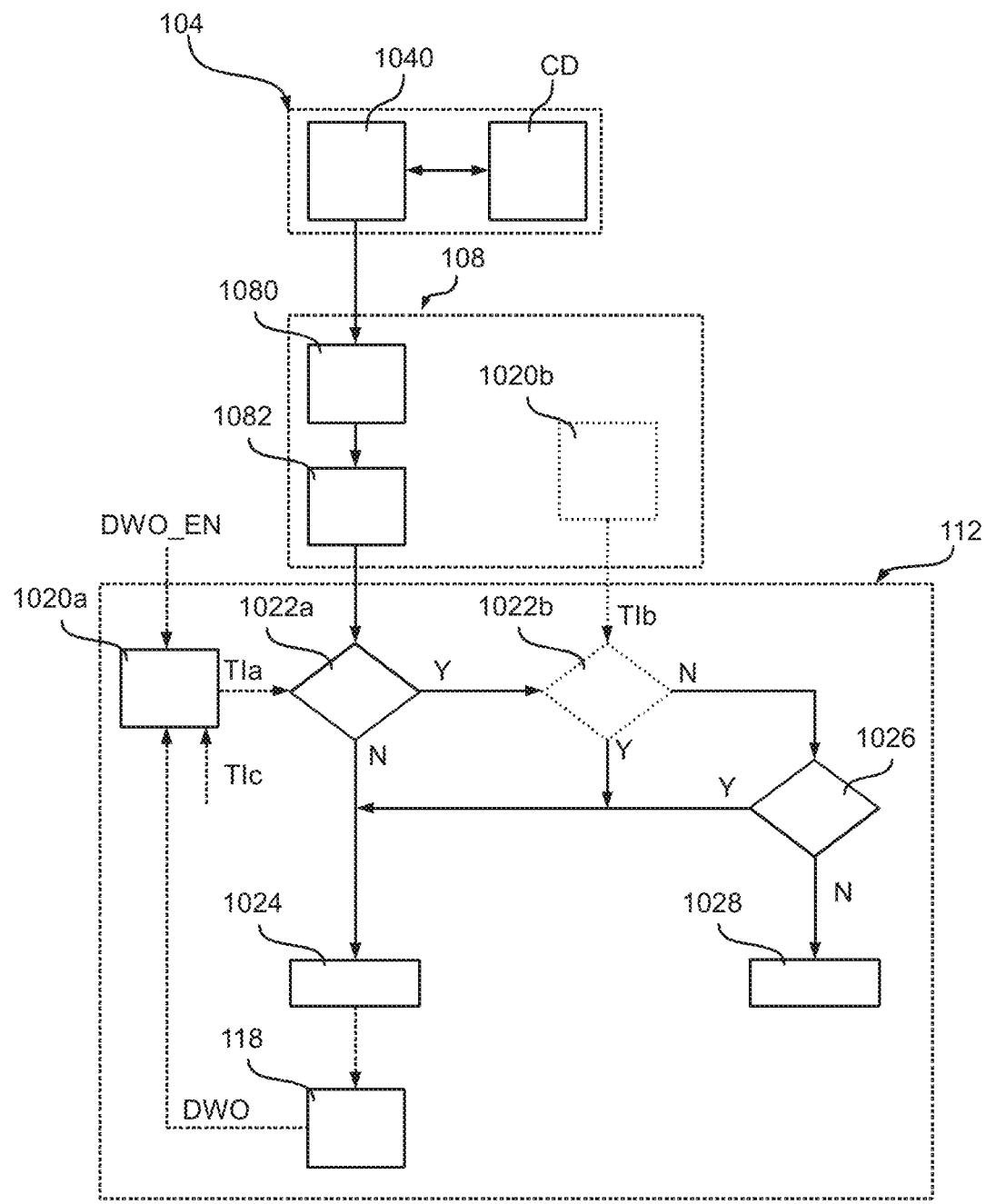
FIG. 13 shows a third embodiment of a configuration circuit and a configuration data client.

For example, FIG. 13 shows an embodiment, which essentially corresponds to the embodiment shown in FIG. 11, with the difference that the type identification unit 1020*a* does not provide a fixed value but a programmable value. Generally, the type identification unit 1020*b* and the verification step 1022*b* are purely optional in this embodiment, i.e. the modifications may also be applied to the circuit 1020 shown in FIG. 10.

Specifically, in various embodiments, the unit 1020*a* generates the signal TIa as a function of the content of the register/latch 118 of the respective configuration data client 112.

Accordingly, by programming the respective register/latch 118 of the configuration data client 112, the configuration data client 112 may be configured (via the verification at the step 1022*a*) as a configuration data client supporting only a single write operation or a plurality of write operations.

Accordingly, by storing the configuration data CD associated with a respective configuration data client 112 into the non-volatile memory 104, it is possible to select the type of the configuration data client 112.

For example, for this purpose, each configuration data packet/DCF frame may comprise a flag DWO indicating whether the respective configuration data client (identified e.g. by the address field ADR) should support single or multiple write operations.

In the embodiment considered, the flag DWO is thus settable for each configuration data client, permitting to selectively change the configuration of individual configuration data clients 112.

Generally, this information may also be only indicative, because some configuration data clients 112 may also not consider at all this flag DWO and permit always only single write operations or always multiple write operations. For example, this may be implemented by means of a hardwiring of the configuration data client.

Instead FIG. 13 shows that the type identification unit 1020*a* (or similarly the unit 1020) may receive at input also a further type identification bit TIc indicating the default type of the respective configuration data client. In various embodiments, this signal TIc may be fixed by the producer of the processing system 10*a*, e.g. by means of a hardwiring.

Accordingly, in this way, when the signal TIc indicates that the configuration data client 112 should support by default only a single write operation, the configuration cannot be changed (or at most via the optional overwriting operation described with respect to FIGS. 11 and 12). Conversely, when the signal TIc indicates that the configuration data client 112 should support by default multiple write operations, the configuration data client may be switched to a configuration data client supporting only a single write operation by programming the flag DWO. Accordingly, preferably, the flag DWO is only taken into account for configuration data clients 112 supporting multiple write operations by default.

Generally, the flag DWO has the impact that instead of permitting indeed only a single write operation, any further write operations will be inhibited. In fact, a plurality of configuration data may be written to the same configuration data client and only once the flag DWO has been set, the configuration data client 112 will inhibit via the steps 1026 and 1028 any further write operation. Accordingly, the register/latch 118 will not provide necessarily the first configuration data received, but indeed the last configuration data stored to the register/latch 118. Accordingly, in this way, e.g. a firmware developer may decide that certain configuration data clients 112 should not accept any further write operation.

In various embodiments, the unit 1020*a* may take into account also further conditions.

For example, in various embodiments, the type identification unit 1020*a* may also verify whether a global enable flag DWO_EN is set. Specifically, the global flag DWO_EN may be used to disable the selection mechanism based on the flag DWO, whereby the type signal TIa correspond always to the default type TIc. For example, the flag DWO_EN may be set during the design phase, e.g. by means of a hardwiring, thereby permitting to tailor the design to different products and security needs.

In various embodiments it may also be useful that configuration data client 112 takes also into account the current life cycle data LCD in order to decide whether configuration data may be written to the register/latch 118.

Figure 14:
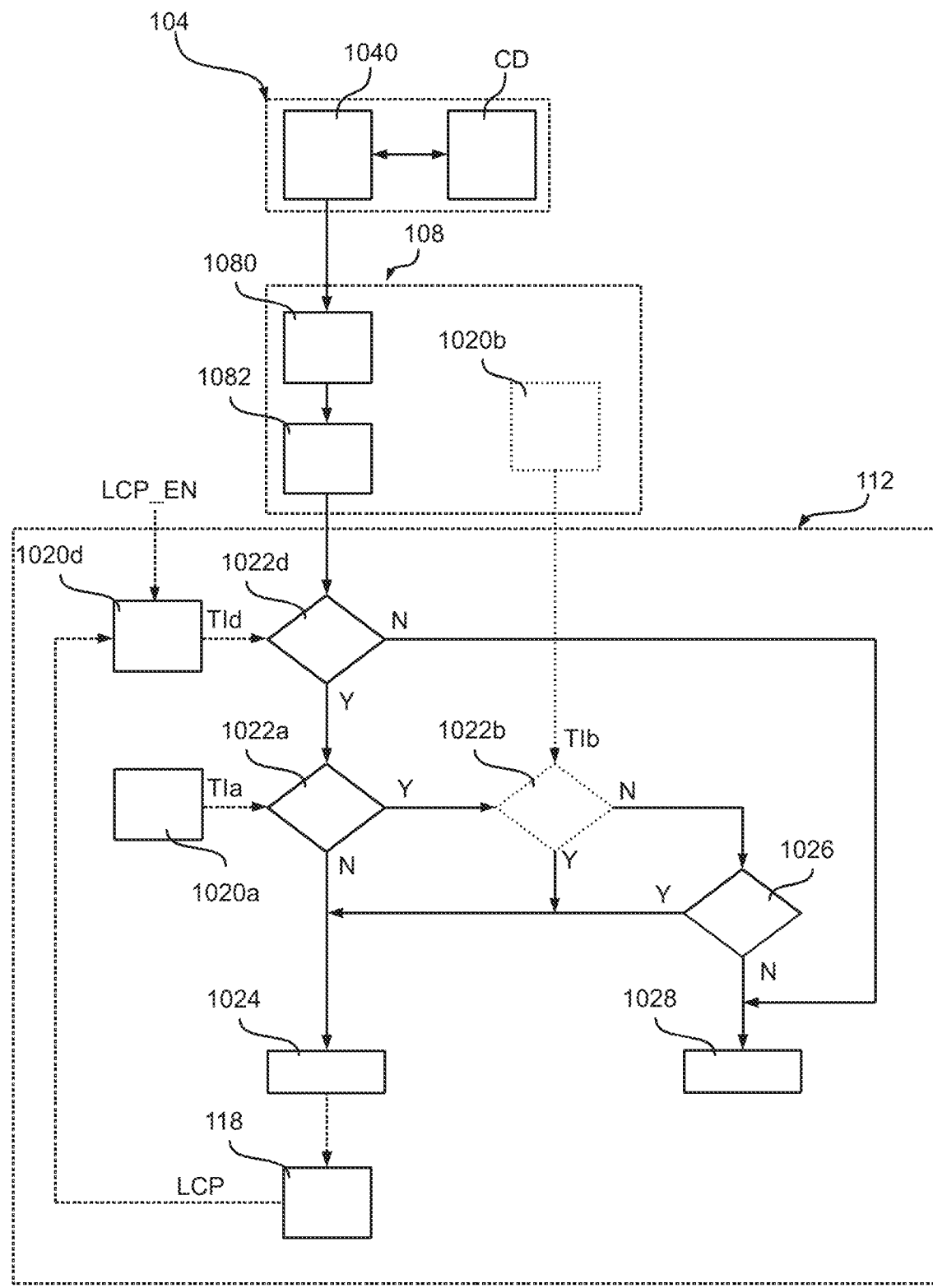
FIGS. 14 and 15 show a fourth embodiment of a configuration circuit and a configuration data client.

For example, FIG. 14 shows an embodiment, wherein one or more configuration data client 112 have associated a respective type identification unit 1020*d*. Generally, the type identification unit 1020*d* may be used in any of the previous embodiments described in the foregoing.

Specifically, in the embodiment considered, the type identification unit 1020*d* receives at input the current life cycle data LCD and one or more bits LCP stored in the register/latch 118 of the respective configuration data client 112. Based on these signals, the type identification unit 1020*d* generates a type identification signal TId indicating whether write operations are permitted or not. Accordingly, similar to the flag DWO, also the one or more bits LCP may be set by storing respective configuration data CD to the non-volatile memory, which are then transmitted via the configuration circuit 108 to the configuration data client 112 and stored to the respective register/latch 118.

For example, in various embodiments, two bits may be used, wherein:

LCP="00" indicates that configuration data may be written in every life-cycle stage;

LCP="01" indicates that writing is accepted only during the stages LC1, LC2 and LC3;

LCP="10" indicates that writing is accepted only during the stages LC1 and LC2; and LCP="11" indicates that writing is accepted only during the stage LC1.

Accordingly, the unit 1020*d* may generate the signal TId as a function of the bits LCP and the current life cycle indicated by the data LCD.

In various embodiments, also the unit 1020*d* may take into account further conditions.

For example, in various embodiments, the type identification unit 1020*d* may verify whether a global enable flag LCP_EN is set. Specifically, the global flag LCP_EN may be used to disable the selection mechanism based on the one or more bits LCP, whereby the type signal TId enables always write operations. For example, the flag LCP_EN may be set during the design phase, e.g. by means of a hardwiring, thereby permitting to tailor the design to different products and security needs.

In the embodiment considered, the configuration data client 112 may thus verify at a step 1022*d* whether the signal TId indicates that write operations are enabled or disabled.

Generally, the step 1022*d* may be performed at any suitable stage before a writing operation is performed. For example, in the embodiment considered, the step 1022*d* is performed immediately when new configuration data CD are received by the configuration data client 112.

Accordingly, in this case, when the write operation is enabled (output "Y" of the verification step 1022*d*), the configuration data client may proceed to the step 1022*a* for verifying the type of the configuration data client.

Conversely, in case the write operation is disabled (output "N" of the verification step 1022*d*), the configuration data client may directly proceed to the step 1028, thereby inhibiting any write operation to the register/latch 118.

Figure 15:
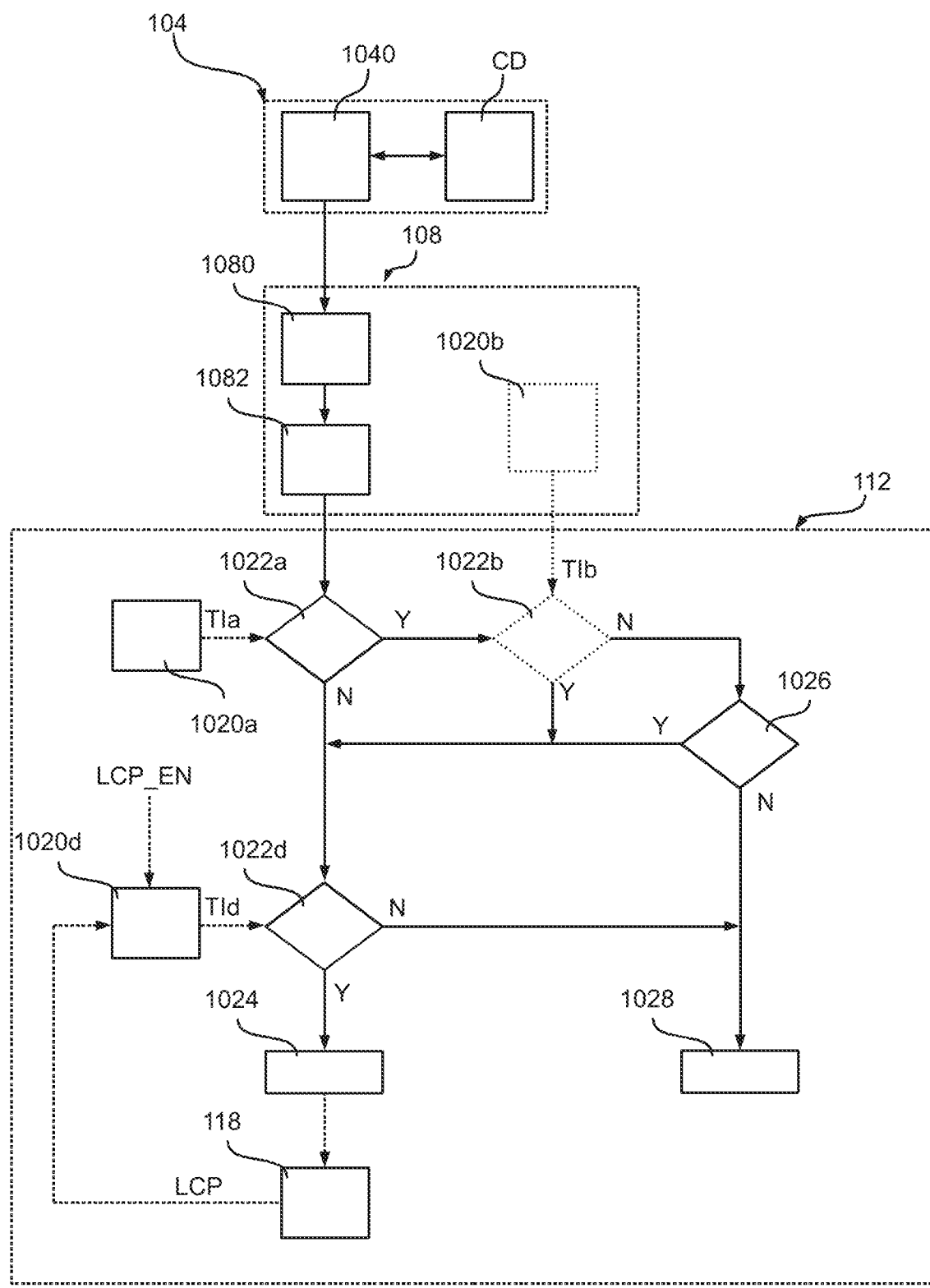

FIG. 15 shows an alternative embodiment, wherein the step 1022*d* is implemented directly before the step 1024. Accordingly, in this case, when the write operation is enabled (output "Y" of the verification step 1022*d*), the configuration data client may proceed to the step 1024 for writing the configuration data to the register/latch 118. Conversely, in case the write operation is disabled (output "N" of the verification step 1022*d*), the configuration data client proceeds again to the step 1028, thereby inhibiting the write operation to the register/latch 118.

Thus, once a first set of configuration data has been received, the respective bits LCP included in the configuration data indicate whether further configuration data may be stored to the register 118 (taking into account the current life cycle), i.e. a first write operation is permitted independently of the LCP bits, insofar as these bits have not been programmed yet. For example, this may be obtained by using as reset value for the bits LCP in the register/latch 118 the sequence indicating that configuration data may be written in every life-cycle stage (e.g. "00").

Thus, in the embodiments considered, a first write operation of configuration data CD to a configuration data client 112 is always permitted and the type identification bits TIa, TIb and/or TIb (or similar bit sequences), determine via the verification steps 1022*a*, 1022*b* and/or 1022*d* whether further write operations are inhibited or permitted. Specifically, at least one of the type identification bits TIa, TIb and/or TIb is determined as a function of a programmable value selected from at least one of: the life cycle data LCD; and/or the mode configuration data MCD associated with the configuration circuit 108; and/or the configuration data CD transmitted to the configuration data client 112 and stored in the respective register/latch 118.

Those of skill in the art will appreciate that in hardware implementation the various verifications may be implemented in parallel.

Figure 16:
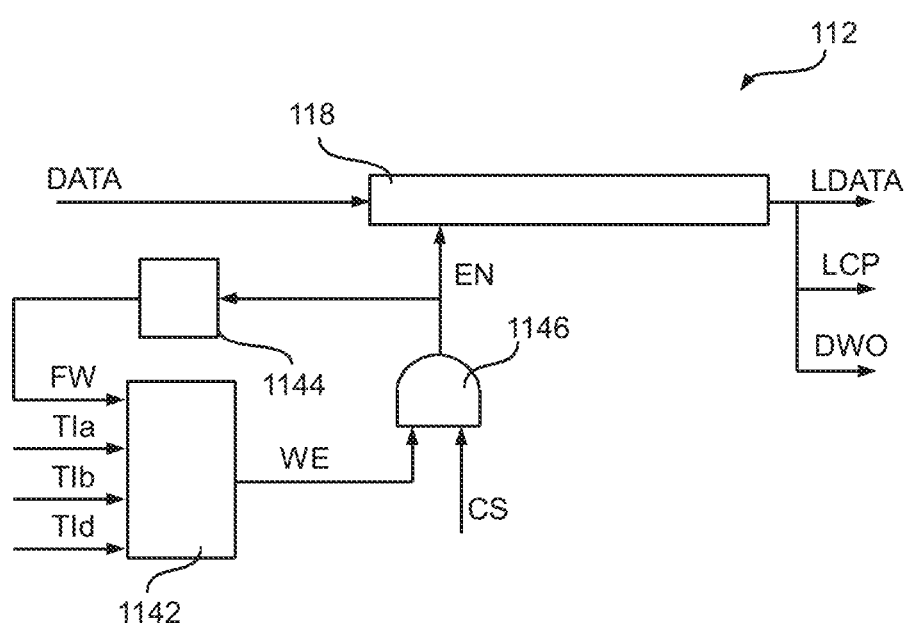
FIG. 16 shows an embodiment of a hardware implementation of the configuration data clients of FIGS. 10 to 15.

For example, as shown in FIG. 16, the configuration data client 112 may generate a write enable signal WE for the register 118 by means of a combinational logic 1142 receiving at input the type signals TI described in the foregoing (e.g. the signals TIa, TIb and TId for the verifications 1022*a*, 1022*b* and 1022*d*) and a flag FW indicating whether a write operation has already been performed (for the verification at the step 1026).

For example, the write enable signal WE together with the chip select signal CS may be used to enable storage of the data signal DATA into the register/latch 118. For example, in FIG. 16 is shown a logic AND gate 1146 generating an enable signal EN for the register/latch 118 as a function of the signals WE and CS.

Once a write operation has been performed, the signal FW changes logic level. For example, in FIG. 16 is shown a register or latch 1144 which changes from low to high, when the signal EN indicates that a write operation has been performed.

The configuration data LDATA stored in the register/latch 118 may then be provided to the associated blocks 110. Moreover, as mentioned before one or more of the bits stored in the register/latch 118 may be used to determine the operation of the configuration data client 112 (see the description of the signals DWO and LCP).

Of course, without prejudice to the principle of the invention, the details of construction and the embodiments may vary widely with respect to what has been described and illustrated herein purely by way of example, without thereby departing from the scope of the present invention, as defined by the ensuing claims.

What is claimed is:

1. A processing system comprising:
a plurality of configuration data clients, each configuration data client comprising a register and an address;
a non-volatile memory comprising configuration data for each configuration data client, wherein the configuration data is stored as data packets comprising an attribute field identifying an address of the configuration data client corresponding to a respective configuration data;
a hardware configuration circuit configured to sequentially read data packets from the non-volatile memory and transmit configuration data to a corresponding configuration data client; and
wherein each configuration data client is configured to:
receive a first set of configuration data and a second set of configuration data addressed to a respective address of the configuration data client,
store the first set of configuration data in a respective register of the configuration data client, and
determine that configuration data may be written to the respective register of the configuration data client based on a type identification signal and, based thereon, overwriting the first set of configuration data by storing the second set of configuration data in the respective register of the configuration data client.

2. The processing system according to claim 1, further comprising a hardware block configured to change operation as a function of configuration data stored in the respective register of the configuration data client.

3. The processing system according to claim 1, wherein the type identification signal is stored in the non-volatile memory.

4. The processing system according to claim 1, wherein the type identification signal is a first type identification signal indicating whether further configuration data may be written to the respective register of the configuration data client.

5. The processing system according to claim 4, wherein each configuration data client comprises a first type identification unit configured to generate the first type identification signal in accordance with:
   a default type identification signal signaling whether further configuration data may be written by default to the respective register of the configuration data client; and
   one or more bits of the configuration data stored in the respective register of the configuration data client, the one or more bits signaling that further configuration data may not be written to the respective register by signaling whether the default type identification signal should be overwritten.

6. The processing system according to claim 4, wherein the type identification signal is a second type identification signal indicating whether further configuration data may be written to the respective register of the configuration data client by signaling whether the first type identification signal is overwritten.

7. The processing system according to claim 6, wherein each configuration data client comprises a second type identification unit configured to generate the second type identification signal in accordance with:
   life-cycle data stored in a one-time programmable memory of the processing system; or
   a signal indicating whether a keyword included in the configuration data corresponds to a fixed reference keyword.

8. The processing system according to claim 6, wherein the type identification signal is a third type identification signal indicating whether further configuration data may not be written to the respective register.

9. The processing system according to claim 8, wherein each configuration data client comprises a third type identification unit configured to generate the third type identification signal in accordance with:
   life-cycle data stored in a one-time programmable memory of the processing system; and
   one or more bits of the configuration data stored in the respective register of the configuration data client, the one or more bits signaling one or more life-cycle stages in which further configuration data may not be written to the respective register.

10. The processing system according to claim 1, wherein each configuration data client is further configured to determine that configuration data may not be written to the respective register of the configuration data client based on the type identification signal and, based thereon, maintaining the first set of configuration data by inhibiting storage of the second set of configuration data.

11. A vehicle comprising a plurality of processing systems, wherein each processing system comprises:
   a plurality of configuration data clients, each configuration data client comprising a register and an address;
   a non-volatile memory comprising configuration data for each configuration data client, wherein the configuration data is stored as data packets comprising an attribute field identifying an address of the configuration data client corresponding to a respective configuration data;
   a hardware configuration circuit configured to sequentially read data packets from the non-volatile memory and transmit configuration data to a corresponding configuration data client; and
   wherein each configuration data client is configured to:
      receive a first set of configuration data and a second set of configuration data addressed to a respective address of the configuration data client,
      store the first set of configuration data in a respective register of the configuration data client, and
      determine that configuration data may be written to the respective register of the configuration data client based on a type identification signal and, based thereon, overwriting the first set of configuration data by storing the second set of configuration data in the respective register of the configuration data client.

12. The vehicle according to claim 11, wherein the type identification signal is a first type identification signal indicating whether further configuration data may be written to the respective register of the configuration data client.

13. The vehicle according to claim 12, wherein each configuration data client comprises a first type identification unit configured to generate the first type identification signal in accordance with:
   a default type identification signal signaling whether further configuration data may be written by default to the respective register of the configuration data client; and
   one or more bits of the configuration data stored in the respective register of the configuration data client, the one or more bits signaling that further configuration data may not be written to the respective register by signaling whether the default type identification signal should be overwritten.

14. The vehicle according to claim 12, wherein the type identification signal is a second type identification signal indicating that further configuration data may be written to the respective register of the configuration data client by signaling whether the first type identification signal is overwritten.

15. The vehicle according to claim 14, wherein each configuration data client comprises a second type identification unit configured to generate the second type identification signal in accordance with:
   life-cycle data stored in a one-time programmable memory of a respective processing system; or
   a signal indicating whether a keyword included in the configuration data corresponds to a fixed reference keyword.

16. The vehicle according to claim 14, wherein the type identification signal is a third type identification signal indicating whether further configuration data may not be written to the respective register of the configuration data client.

17. The vehicle according to claim 16, wherein each configuration data client comprises a third type identification unit configured to generate the third type identification signal in accordance with:
   life-cycle data stored in a one-time programmable memory of a respective processing system; and
   one or more bits of the configuration data stored in the respective register of the configuration data client, the one or more bits signaling one or more life-cycle stages in which further configuration data may not be written to the respective register.

18. The vehicle according to claim 12, wherein each configuration data client is configured to determine that configuration data may not be written to the respective register of the configuration data client based on the type identification signal and, based thereon, maintaining the first set of configuration data by inhibiting storage of the second set of configuration data.

19. A method of operating a processing system, the method comprising:
   having a plurality of configuration data clients, each configuration data client comprising a register and an address;
   having a non-volatile memory comprising configuration data for each configuration data client;
   setting a type identification signal in the non-volatile memory, wherein the configuration data is stored as data packets comprising an attribute field identifying an address of the configuration data client corresponding to a respective configuration data;
   sequentially reading data packets from the non-volatile memory;
   transmitting configuration data to a corresponding configuration data client;
   receiving a first set of configuration data and a second set of configuration data addressed to a respective address of the configuration data client;
   storing the first set of configuration data in a respective register of the configuration data client; and
   determine that further configuration data may be written to the respective register of the configuration data client based on a type identification signal and, based thereon, overwriting the first set of configuration data by storing the second set of configuration data in the respective register of the configuration data client.

20. The method according to claim 19, wherein the type identification signal is:
   a first type identification signal indicating whether further configuration data may be written to the respective register of the configuration data client;
   a second type identification signal indicating that further configuration data may be written to the respective register of the configuration data client by signaling whether the first type identification signal is overwritten; or
   a third type identification signal indicating whether further configuration data may not be written to the respective register of the configuration data client.

21. The method according to claim 20, further comprising generating the first type identification signal in accordance with:
   a default type identification signal signaling whether further configuration data may be written by default to the respective register of the configuration data client; and
   one or more bits of the configuration data stored in the respective register of the configuration data client, the one or more bits signaling that further configuration data may not be written to the respective register by signaling whether the default type identification signal should be overwritten.

22. The method according to claim 20, further comprising generating the second type identification signal in accordance with:
   life-cycle data stored in a one-time programmable memory of the processing system; or
   a signal indicating whether a keyword included in the configuration data corresponds to a fixed reference keyword.

23. The method according to claim 20, further comprising generating the third type identification signal in accordance with:
   life-cycle data stored in a one-time programmable memory of the processing system; and
   one or more bits of the configuration data stored in the respective register of the configuration data client, the one or more bits signaling one or more life-cycle stages in which further configuration data may not be written to the respective register.

24. The method according to claim 19, further comprising determining that configuration data may not be written to the respective register of the configuration data client based on the type identification signal and, based thereon, maintaining the first set of configuration data by inhibiting storage of the second set of configuration data.

* * * * *